United States Patent
Nakazawa et al.

(10) Patent No.: US 9,280,131 B2
(45) Date of Patent: Mar. 8, 2016

(54) DEVELOPER CONTAINER, DEVELOPING APPARATUS, CLEANING APPARATUS, PROCESS CARTRIDGE, AND IMAGE FORMING APPARATUS

(71) Applicant: CANON KABUSHIKI KAISHA, Tokyo (JP)

(72) Inventors: Ryosuke Nakazawa, Yokohama (JP); Sho Shirakata, Kawasaki (JP); Tachio Kawai, Odawara (JP); Kenji Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/259,715

(22) Filed: Apr. 23, 2014

(65) Prior Publication Data

US 2014/0321883 A1    Oct. 30, 2014

(30) Foreign Application Priority Data

Apr. 25, 2013 (JP) .................. 2013-093096

(51) Int. Cl.
 *G03G 21/18* (2006.01)
 *G03G 21/16* (2006.01)
 *G03G 15/08* (2006.01)

(52) U.S. Cl.
 CPC ........ *G03G 21/1676* (2013.01); *G03G 15/0896* (2013.01); *G03G 21/169* (2013.01); *G03G 21/181* (2013.01); *G03G 21/1825* (2013.01); *Y10T 156/10* (2015.01)

(58) Field of Classification Search
 CPC ............ G03G 21/1619; G03G 21/181; G03G 21/1676; G03G 21/169; G03G 21/1821; G03G 2215/0877

USPC .......................... 399/103, 109–111, 119, 262
See application file for complete search history.

(56) References Cited

U.S. PATENT DOCUMENTS

| | | | |
|---|---|---|---|
| 6,684,039 B1 | 1/2004 | Wazana | |
| 2002/0067930 A1 | 6/2002 | Oguma | |
| 2003/0012583 A1 | 1/2003 | Okoshi | |
| 2005/0185980 A1* | 8/2005 | Okamoto | 399/103 |
| 2005/0232654 A1 | 10/2005 | Karakama | |
| 2010/0104327 A1* | 4/2010 | Handa | G03G 15/0881 399/263 |
| 2011/0158687 A1* | 6/2011 | Mori | 399/119 |

FOREIGN PATENT DOCUMENTS

| | | |
|---|---|---|
| JP | 2002-040781 A | 2/2002 |
| JP | 2005-091809 A | 4/2005 |

\* cited by examiner

*Primary Examiner* — Walter L Lindsay, Jr.
*Assistant Examiner* — Jessica L Eley
(74) *Attorney, Agent, or Firm* — Canon USA Inc. IP Division

(57) ABSTRACT

Provided is a developer container that accommodates developer, including: a first frame that has a recessed portion; and a second frame that has a first protruding portion, wherein the first frame and the second frame are joined by a first adhering portion in which the recessed portion and the first protruding portion are welded together, and a second adhering portion in which a second protruding portion and a flat portion are welded together, the recessed portion having a positioning inner side face that performs positioning of the first frame and the second frame within a recessed portion. Also provided are a method to manufacture a developer container, a developing apparatus having the developer container, a cleaning apparatus, a process cartridge, and an image forming apparatus.

18 Claims, 31 Drawing Sheets

DEVELOPER CONTAINER, DEVELOPING APPARATUS, CLEANING APPARATUS, PROCESS CARTRIDGE, AND IMAGE FORMING APPARATUS

BACKGROUND OF THE INVENTION

1. Field of the Invention

The present invention relates to a developer container that accommodates developer, a developing apparatus that has the developer container, and a cleaning apparatus that removes developer that remains on an image bearing member. Also, the present invention relates to a process cartridge that has the developing apparatus or cleaning apparatus, and an image forming apparatus (electrophotographic image forming apparatus) that has a process cartridge.

Now, an electrophotographic image forming apparatus forms an image on a recording medium using an electrophotographic image forming process. For example, the electrophotographic image forming apparatus may be a copier, printer (LED printer, laser beam printer, or the like), facsimile device, or word processor.

Also, a process cartridge is a cartridge where at least one of a charging device, developing device, and cleaning device serving as a process device, and an imaging bearing member, are integrated into a cartridge. The process cartridge can be used so as to be detachable from the image forming apparatus.

Also, the developing apparatus has at least the developing device integrated into a cartridge, and the cartridge may be used in a detachable manner as to the image forming apparatus main body.

Also, the cleaning apparatus may be integrated into the cartridge as a cleaning device, and may be used in a detachable manner as to the image forming apparatus main body.

2. Description of the Related Art

Heretofore, a so-called process cartridge method has been used wherein, in an electrophotographic image forming apparatus, a processing device that is used to form images is made in a cartridge form, which is detachably mounted to the image forming apparatus main body. According to this process cartridge method, maintenance of the electrophotographic image forming apparatus can be performed by the user, without relying on a service worker. Accordingly, operations of maintenance can be markedly improved.

A developer container that accommodates developer may be used as such a processing cartridge. The developer cartridge may be formed by the contact portions of a developer frame and a developer container lid abutting against each other and being joined by ultrasonic wave welding (Japanese Patent Laid-Open No. 2002-40781). This ultrasonic wave welding is used for other than process cartridges, as a method to adhere frames together (Japanese Patent Laid-Open No. 2005-91809).

However, according to the configuration in (Japanese Patent Laid-Open No. 2002-40781), a positioning portion and adhering portion have to be determined for each frame, and further, the positioning portion is provided on the outer side of the adhering portion. Therefore, the size of the developer container that includes the positioning portions increases. Further, since the positioning portions for each frame are in a fitting-in relation, the position between the frames may deviate by an amount equivalent to the play in the fit parts. Therefore, the developer container after joining may become larger.

SUMMARY OF THE INVENTION

Thus, according to the present invention, a developer container that accommodates developer includes a first frame that has a recessed adhering portion; and a second frame that has a first protruding portion, wherein the first frame and the second frame are joined by a first adhering portion in which the recessed portion and the first protruding portion are welded together, and a second adhering portion in which a second protruding portion and a flat portion are welded together, the recessed portion having a positioning inner side face that performs positioning of the first frame and the second frame within a recessed portion.

Also, a developer apparatus having a method to manufacture a developer container and the developer container, cleaning apparatus, process cartridge, or image forming apparatus, is provided.

Further features of the present invention will become apparent from the following description of exemplary embodiments with reference to the attached drawings.

DESCRIPTION OF THE EMBODIMENTS

Figure 1:
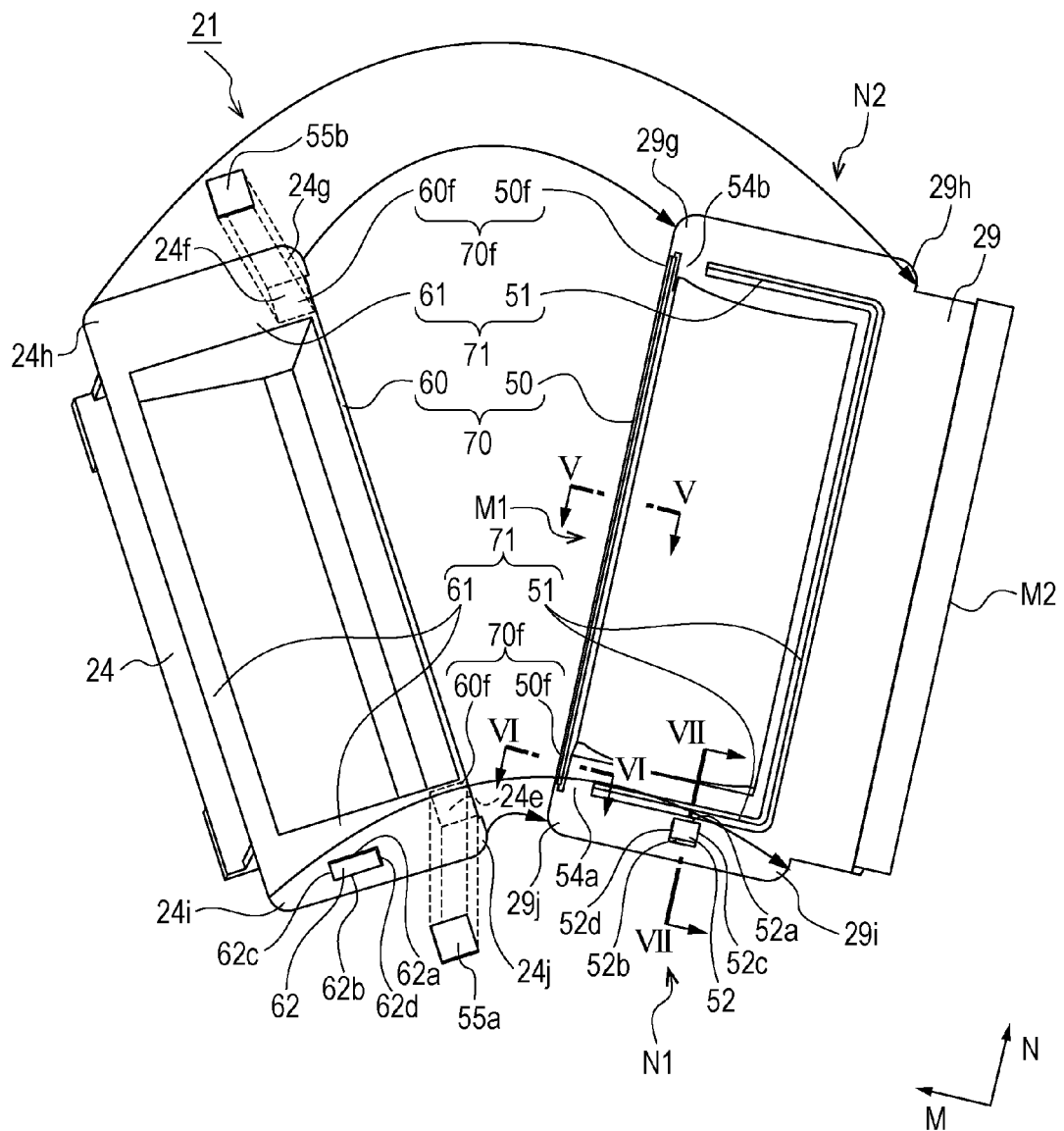
FIG. 1 is a perspective view to illustrate a joining configuration of a toner container lid and a developer frame.

Embodiments of the present invention will be described below, with reference to the appended diagrams and examples. Note that the scope of the invention of the functions, properties, and forms of the configuration parts described in these embodiments, and the relative disposal of the parts thereof, are not to be limited to the descriptions given, unless a particular identification is described. Also, the material, form, and so forth of a member described once in the description below will be considered similar to the first description, unless particularly described again.

First Embodiment

First, an image forming apparatus, developing apparatus, and process cartridge will be described with reference to the diagrams.

In the descriptions below, the lengthwise direction of the process cartridge (or the lengthwise direction N) matches the rotation axial direction of the electrophotographic photosensitive drum which is an image bearing member. Also, the transverse direction of the process cartridge (or the transverse direction M) is a direction that intersects with the rotational axis of the electrophotographic photosensitive member.

Also, the upper direction as relates to the process cartridge refers to the upper direction when the process cartridge has been installed in the apparatus main body, and the lower direction refers to the lower direction when in the same state.
Overall Configuration of Image Forming Apparatus An overall configuration of the image forming apparatus which is an exemplary embodiment of the present embodiment will be described with reference to FIG. 2. An image forming apparatus 1 illustrated in FIG. 2 forms an image on a recording medium P by a developer, using an electrophotographic image forming process, according to image information from an external device such as a computer that is communicably connected to an apparatus body 1a. The recording medium P may be a recording sheet, OHP sheet, or fabric, for example.

An electrophotographic photosensitive drum (hereinafter called "photosensitive drum") 2, serving as the image bearing member, rotates in the arrow A direction, whereby the surface of the photosensitive drum 2 is uniformly charged by a charging roller 3 which is a charging device. A laser beam L according to the image information from an optical device (exposure device) 4 is irradiated onto the photosensitive drum 2 to form an electrostatic latent image according to the image information on the photosensitive drum 2. The electrostatic latent image on the photosensitive drum 2 that has been formed here is developed by toner t, which is a developer, by a later-described developing roller 22, which is a developer bearing member, thereby forming a toner image (developed image).

Figure 2:
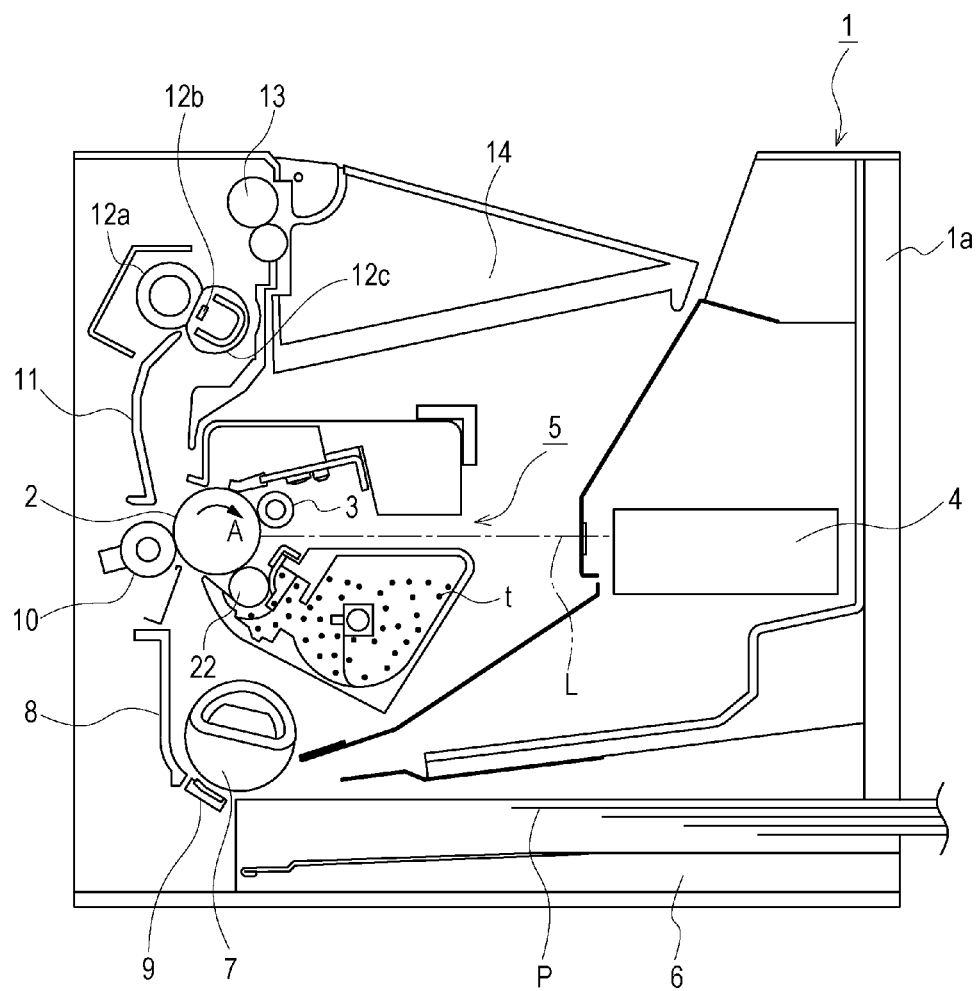
FIG. 2 is an overall configuration diagram to illustrate the overall configuration according to an embodiment of an image forming apparatus.

According to the image forming apparatus illustrated in FIG. 2, a process cartridge 5 which has a photosensitive drum, charging roller, developing device, and cleaning device, is used.

Upon the process cartridge 5 being appropriately installed in the apparatus main body 1a as illustrated in FIG. 2, contact points (unshown) of the apparatus main body 1a and connect points (unshown) of the process cartridge 5 are electrically connected. Therefore, predetermined charging bias and developing bias can be applied to the charging roller 3 and developing roller 22 respectively from a voltage applying device (unshown) provided to the apparatus main body 1a.

Also, the apparatus main body 1a and a driving transmitting unit (unshown) of the process cartridge 5 are linked. The driving force from a driving device (unshown) such as a driving motor or the like provided by the apparatus main body 1a can be transmitted to the process cartridge 5.

According to the present embodiment, the drive of the driving device provided by the apparatus main body 1a is transmitted to the photosensitive drum 2, and the driving force herein is transmitted to the developing roller 22 which is a developing bearing member, and agitating device 26, and the like, via a driving transmitting unit such as a gear train. Note that a driving device that independently drives each element, such as the agitating device 26 or the like, for example, may be provided independently of the apparatus main body 1a, via the driving transmitting unit provided on the apparatus main body side and the process cartridge side.

On the other hand, the recording medium P that is set in a feeding cassette 6 is separated and fed, one sheet at a time, by a pickup roller 7 and a pressure contact member 9 that makes pressure contact thereto, synchronously with the forming of the toner image (developed image). The recording medium P is transported to a transfer roller 10 serving as a transfer device, along a conveyance guide 8. Next, the recording medium P passes a transfer nip portion, which is formed by the photosensitive drum 2 and the transfer roller 10 to which a fixed voltage has been applied. The toner image (developed image) that is formed on the photosensitive drum 2 is transferred to the recording medium P at this time. The recording medium P having received the transfer of the toner image (developed image) is conveyed to a fixing device 12 by a conveyance guide 11. This fixing device 12 has a driving roller 12a and a fixing roller 12c which houses a heater 12b. Heat and pressure are applied to the recording medium P that passes through the nip portion which is formed by the fixing roller 12c and driving roller 12a, thereby fixing the transferred toner image (developed image) thereto. Subsequently, the recording medium P is conveyed by a discharge roller pair 13, and is discharged to a discharge tray 14.

Process Cartridge

Next, the process cartridge 5 that is detachable as to the apparatus main body 1a according to the present exemplary embodiment will be described with reference to FIGS. 3 and 4.

Figure 3A:
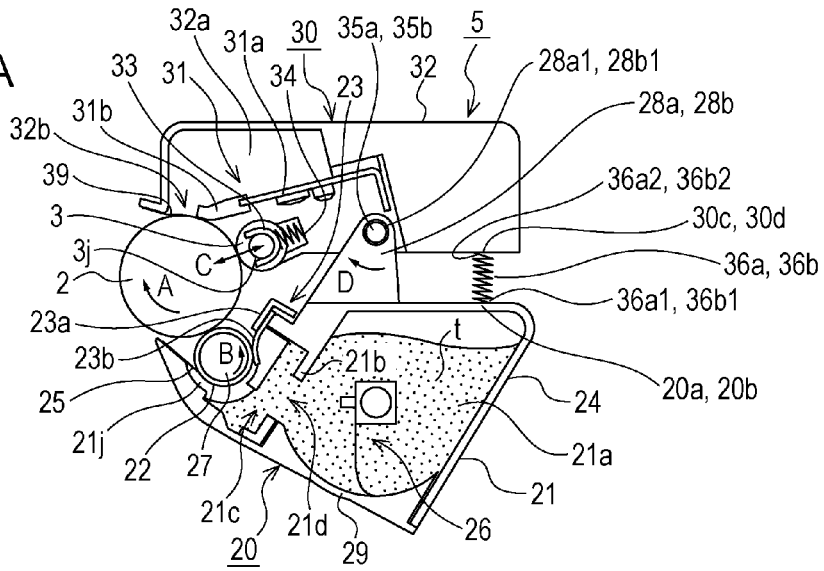
FIGS. 3A through 3C are cross-sectional configuration diagrams of a process cartridge.

The process cartridge 5 has a photosensitive unit (cleaning apparatus) 30, which is a first unit having a photosensitive drum 2, charging roller 3, and cleaning blade which is a cleaning device, as illustrated in FIG. 3A. Further, the process cartridge 5 has a developing unit (developing apparatus) 20, which is a second unit having a developing roller 22 which is a developer bearing member that bears a developer. The process cartridge is thus configured including two separate units. As illustrated in FIG. 4, the photosensitive drum 2 is rotatably attached, via a drum bearing 37 and a positioning pin 38, to a cleaning frame 21 of the photosensitive unit (cleaning apparatus) 30 (FIG. 4). The driving force of the driving motor (unshown) is transmitted to the photosensitive unit 30, whereby the photosensitive drum 2 is driven so as to rotate in the arrow A direction according to an image forming operation. The charging roller 3 and cleaning blade 31 are disposed on the periphery of the photosensitive drum 2.

The cleaning blade 31 is made up of a cleaning member 31b that is integrated with a blade supporting portion 31a or attached thereto, as illustrated in FIG. 3A. This cleaning member 31b is abutted against the photosensitive drum 2 to scrape off the toner remaining on the surface of the photosensitive drum 2, whereby toner is removed from the drum surface. The residual toner is contained in a waste toner accommodation section 32a.

Also, an upper opening 32b which is between the photosensitive drum 2 and the cleaning frame 32 that forms the waste toner accommodation section 32a is provided with a spill-inhibiting sheet 39 that seals between the photosensitive drum 2 and the upper opening 32b, whereby toner leakage in the upper direction of the photosensitive drum 2 is inhibited.

A charging roller bearing 33 is attached to the cleaning frame 32 in the direction that is movable in the direction of arrow C through the center of the charging roller 3 and the center of the photosensitive drum 2. A shaft 3j of the charging roller 3 is rotatably attached to the charging roller bearing 33. The bearing 33 is in a state of being pressured toward the photosensitive drum 2 by a charging roller pressing member 34.

According to the present embodiment, the developing unit 20 has a developer container 21 that accommodates a magnetic one-component developer (toner) made up of magnetic resin toner particles as the developer. It goes without saying that a two-component developer or a non-magnetic developer may be used, or a developer that includes an external agent in the magnetic resin toner particles.

The developing unit and cleaning apparatus itself may each be used in a detachable matter as to the apparatus main body. Also, there may be cases wherein the developing unit and cleaning apparatus are used in a form that is built in to the apparatus main body rather than detachably.

The developer container 21 is made up of a developer frame 24 which is a first frame that accommodates the toner t, and a developer container lid which is a second frame (hereinafter called "toner container lid") 29, which are fixed together, for example by ultrasonic wave welding or other forms of adhesion. Further, the developer frame 24 supports the agitating device 26, and forms a developer accommodation section 21a that accommodates the toner internally. The developer container 21 is partitioned into a developer accommodation section 21a and developing chamber 21c by a partition portion 21b, and the developer accommodation section 21a and developing chamber 21c communicate via a supply opening 21d in the partition portion 21b (hereinafter called "toner supply opening").

The developing unit (developing apparatus) 20 which provides this developer container has a developing roller 22 which is a developing device to supply toner to the electrostatic latent image formed on the photosensitive drum 2 and thus form a visible image. Also, a developing blade 23 which is a developer layer thickness regulation device to apply a triboelectric charge to the toner and form a toner layer on the surface of the developing roller 22, is provided to the developing unit along with other members as well.

Also, joining with the developer frame 24 forms a lower opening 21j, which is between the toner container lid 29 that forms the developing chamber 21c and the developing roller 22. Also, the lower opening 21j is provided with a spill-inhibiting sheet 25 that inhibits toner leakage between the developing roller 22 and the lower opening 21j.

The toner within the developer accommodation section 21a is conveyed from the toner supply opening 21d to the developing chamber 21c side by the rotation of the agitating device 26, and is fed out to the developing roller 22 that has a built-in fixed magnet 27 and that rotates in the arrow B direction. A developer thickness regulation member 23b is provided integrally with the blade supporting portion 23a of the developing blade 23 or adhered thereto. Triboelectric charge is applied to the blade supporting portion 23a by the developing roller 22 and the developer thickness regulation member 23b, while the toner layer of which the thickness is regulated is formed on the surface of the developing roller 22.

Figure 4:
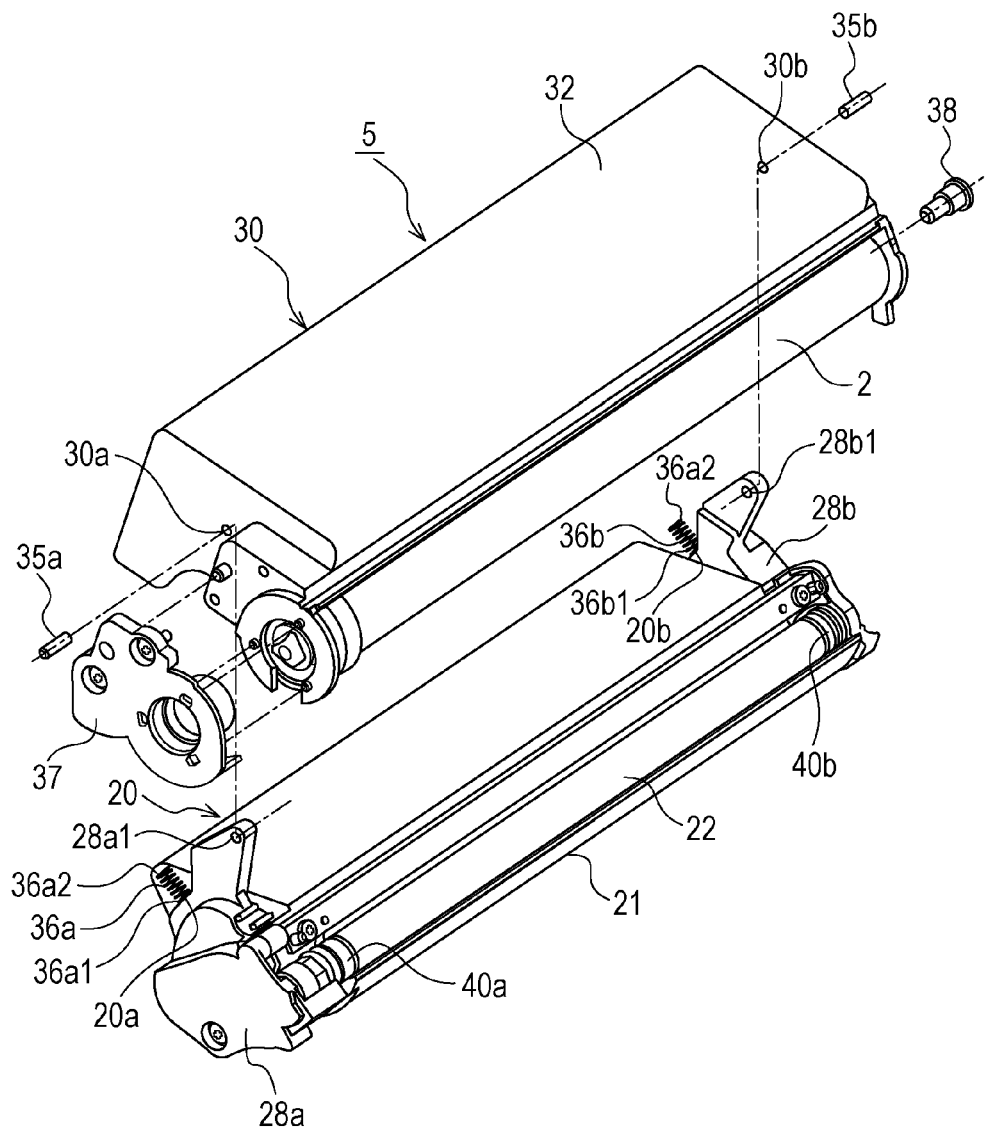
FIG. 4 is an exploded perspective view of a process cartridge.

As illustrated in FIG. 4, the developing roller 22 is rotatably supported by the developer container 21, via a developer bearing 28a and a developer bearing 28b which are attached, each to one side, in the lengthwise direction of the developer container 21. The developing roller 22 maintains a fixed clearance as to the photosensitive drum 2, and therefore spacer rollers 40a and 40b, which are gap holding members that are rotatably supported, are disposed on the ends of the developing roller 22.

Also, holes 28a1 and 28b1 are provided in the developing bearings 28a and 28b. The developing unit 20 is turnably joined to holes 30a and 30b provided on the ends in the lengthwise direction of the photosensitive unit 30, with joining shafts 35a and 35b, serving as joining members that fit into the holes 28a1 and 28b1 respectively, as the center thereof.

End portions 36a1 and 36b1 of pressure springs 36a and 36b that press the developing unit 20 to the photosensitive drum 2 are attached to the supporting units 20a and 20b, respectively, on the ends in the lengthwise direction of the developing unit 20. The pressure springs 36a and 36b are disposed on the opposite side of the joining shafts 35a and 35b, which are the rotation centers as to the photosensitive unit 30 of the developing unit 20, from the photosensitive drum 2.

In a case where the developing unit 20 and photosensitive unit 30 are joined by the joining shafts 35a and 35b, the other end portions 36a2 and 36b2 of the pressure springs 36a and 36b contacts receiving faces 30c and 30d of the photosensitive unit (see FIG. 3A).

As illustrated in FIG. 3A, the pressure springs 36a and 36b are compressed between the receiving faces 30c and 30d of the photosensitive unit 30 and the supporting units 20a and 20b. Therefore, the developing unit 20 is pressed to the photosensitive drum 2 by momentum D around the joining shafts 35a and 35b. The toner layer formed on the surface of the developing roller 22 is then supplied to a developing area of the photosensitive drum 2. The toner image is formed by the toner being moved to the photosensitive drum 2 according to the electrostatic latent image formed on the photosensitive drum 2.

Figure 3B:
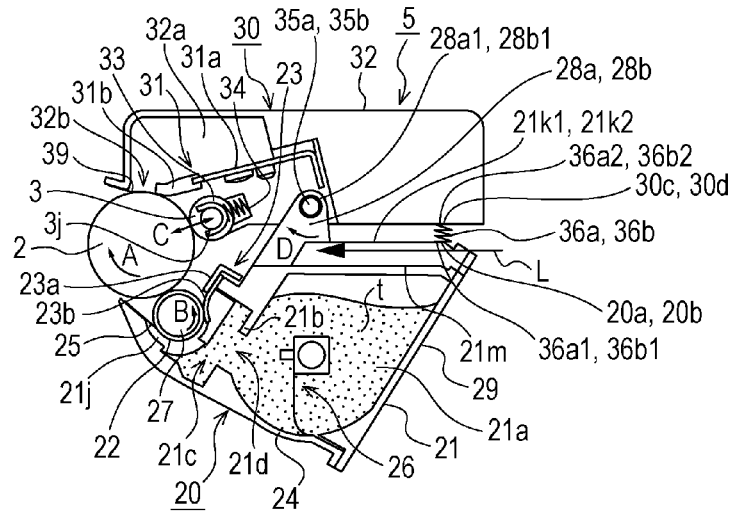
Figure 3C:
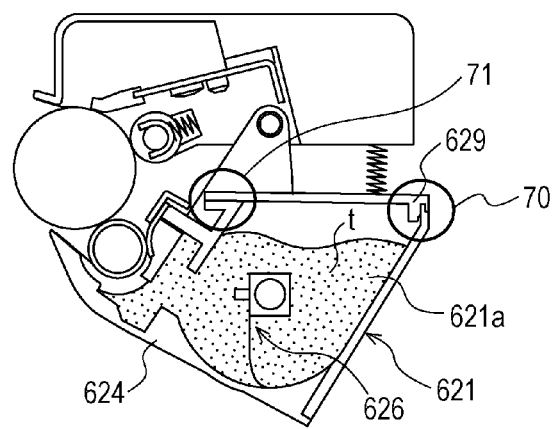

Examples of other embodiments are illustrated in FIGS. 3B and 3C.

The developer container illustrated in FIG. 3B has a configuration that does not inhibit a laser beam from passing through a first protruding toner storage section 21k1 and a second protruding toner storage section 21k2, while securing space through which a laser beam from an exposure device can pass. Therefore, the amount of toner t accommodated can be increased.

A developer container 621 illustrated in FIG. 3C is made up of a developer frame 624 which is a first frame that forms a developer storage portion 621a, supports an agitating device 626, and accommodates toner t therein, and a toner container lid 29 which is a second frame, which are fixed by ultrasonic wave welding. As illustrated in FIG. 3C, an adhering portion near the photosensitive drum is a second adhering portion 71, and farther away is a first adhering portion 70, which are joined together.

Configuration of Developer Accommodating Container and Adhering Portion

The developer container 21 is made up of a developer frame 24 which is a first frame that accommodates the toner t and a toner container lid 29 which is a second frame, so as to be joined (fixed) by ultrasonic wave welding. The joining configuration that is fixed by welding will be described with reference to FIG. 1.

FIG. 1 is a perspective view to illustrate the joining configuration of the toner container lid 29 and the developer frame 24. In this case, the developer container 21 is configured by matching the corners 29g, 29h, 29i, and 29j of the toner container lid 29 with the corners 24g, 24h, 24i, and 24j of the developer frame 24.

As illustrated in FIG. 1, a recessed adhering portion 50 is provided to one end side M1 in the transverse direction M of the toner container lid 29 (left side of FIG. 1). A recessed end adhering portion 50f is provided on both end sides in the lengthwise direction N of the recessed adhering portion 50. Also, a protruding adhering portion 51 is provided in an open box shape on the other end side M2 in the transverse direction M (right side of FIG. 1) and on both end sides in the lengthwise direction N. Also, a boss portion 52 that performs positioning in the lengthwise direction N of the toner container lid 29 and developer frame 24 is provided to the outer side in the lengthwise direction N of the protruding adhering portion 51 on one end side N1 in the lengthwise direction (bottom of FIG. 1).

An adhesion-receiving protruding portion 60 is provided to the developer frame 24, at a position facing the recessed adhering portion 50. An adhesion-receiving protruding end portion 60f is provided to the end portion, at a position facing the recessed end adhering portion 50f.

Also, a flat adhering portion 61 that has a flat portion at a position facing the protruding adhering portion 51, is provided.

A rectangular hole 62 that performs positioning in the lengthwise direction N of the toner container lid 29 and developer frame 24 is provided so as to fit to the boss portion 52. Lengthwise faces 52a and 52b of the boss portion 52 and lengthwise faces 62a and 62b of the hole 62 fit together, whereby the positions in the lengthwise direction N of the toner container lid 29 and developer frame 24 are determined. At this time, a space is provided between the transverse direction faces 52c and 52d of the boss portion 52 and the transverse direction faces 62c and 62d of the hole 62, so as to not restrict the position in the transverse direction M of the toner container lid 29 and developer frame 24. The configuration of positioning in the transverse direction M of the toner container lid 29 and developer frame 24 will be described later.

At this time, a first adhering portion 70 serving as a joining portion is formed by the recessed adhering portion 50 and the adhesion-receiving protruding portion 60 being joined together. A first end adhering portion 70f serving as a joining portion is formed by the recessed end adhering portion 50f and adhesion-receiving protruding end portion 60f being joined together. A second adhering portion 71 serving as a joining portion is formed by the protruding adhering portion 51 and the flat face portion of the flat adhering portion 61 being joined together.

According to the exemplary embodiment illustrated in FIG. 1, the first end adhering portion 70f and the second adhering portion 71 do not intersect, and spaces 54a and 54b are provided. Sealing members 55a and 55b that fill in the spaces 54a and 54b between the first end adhering portion 70f and the second adhering portion 71 and that inhibit the toner from leaking to the outside of the developer container 21 are provided. The sealing members 55a and 55b are attached to sealing member attaching portions 24e and 24f of the developer frame 24 with an adhesive such as two-sided adhesive tape or the like. Details of the configuration of the sealing members 55a and 55b will be described later. According to the embodiment illustrated in FIG. 1, the first end adhesive portion 70f and the second adhesive portion do not intersect, but an arrangement may be made wherein intersection is made.

Here, the developer frame is the first frame and the toner container lid is the second frame, but the developer frame may be the second frame and the toner container lid may be the first frame.

Configuration of First Adhering Portion

The first adhering portion 70 will be described with reference to FIGS. 5 and 6.

Details will be described later, but the first adhering portion is made up of the recessed adhering portion 50 and the adhesion-receiving protruding portion 60, which have been welded together. Also, the first end adhering portion is a part of the first adhering portion.

Figure 5:
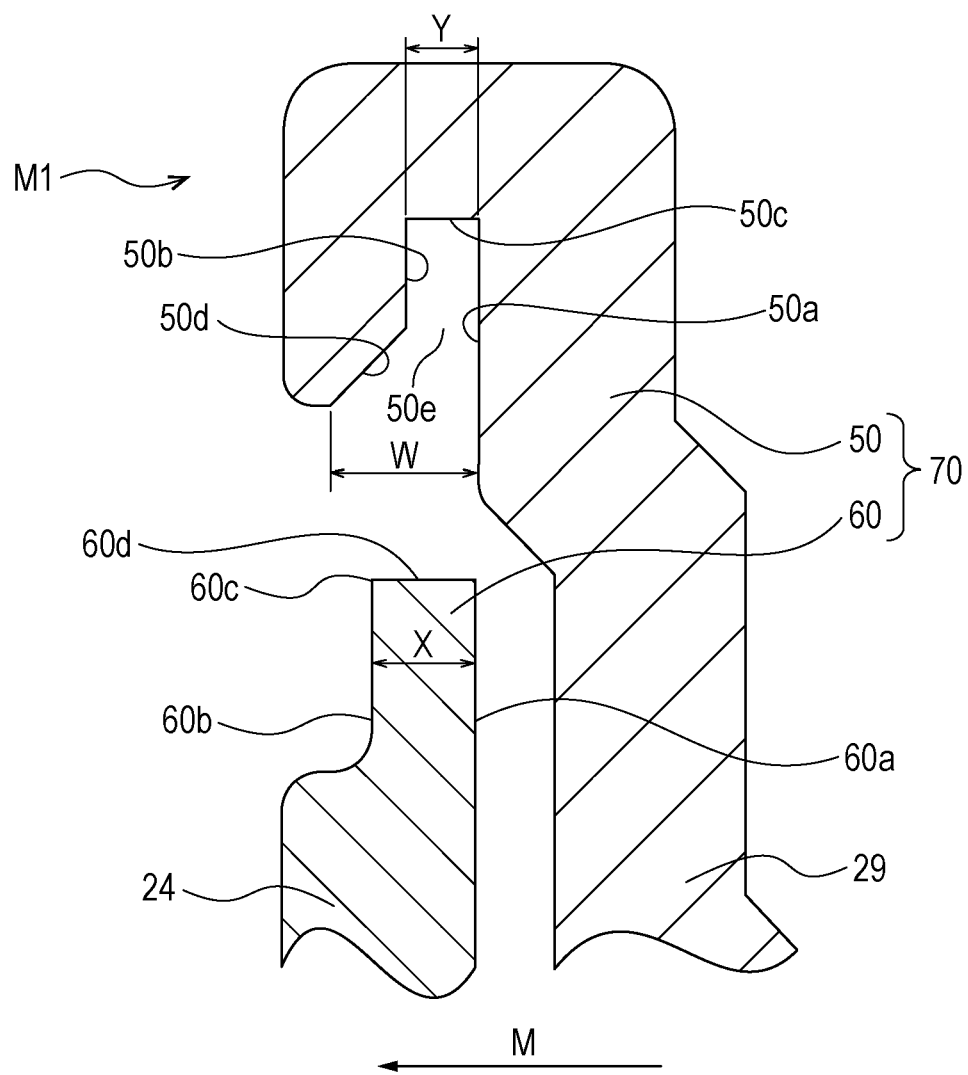
FIG. 5 is a cross-sectional view taken along line V-V in FIG. 1, to illustrate a configuration of a first adhering portion.
Figure 6:
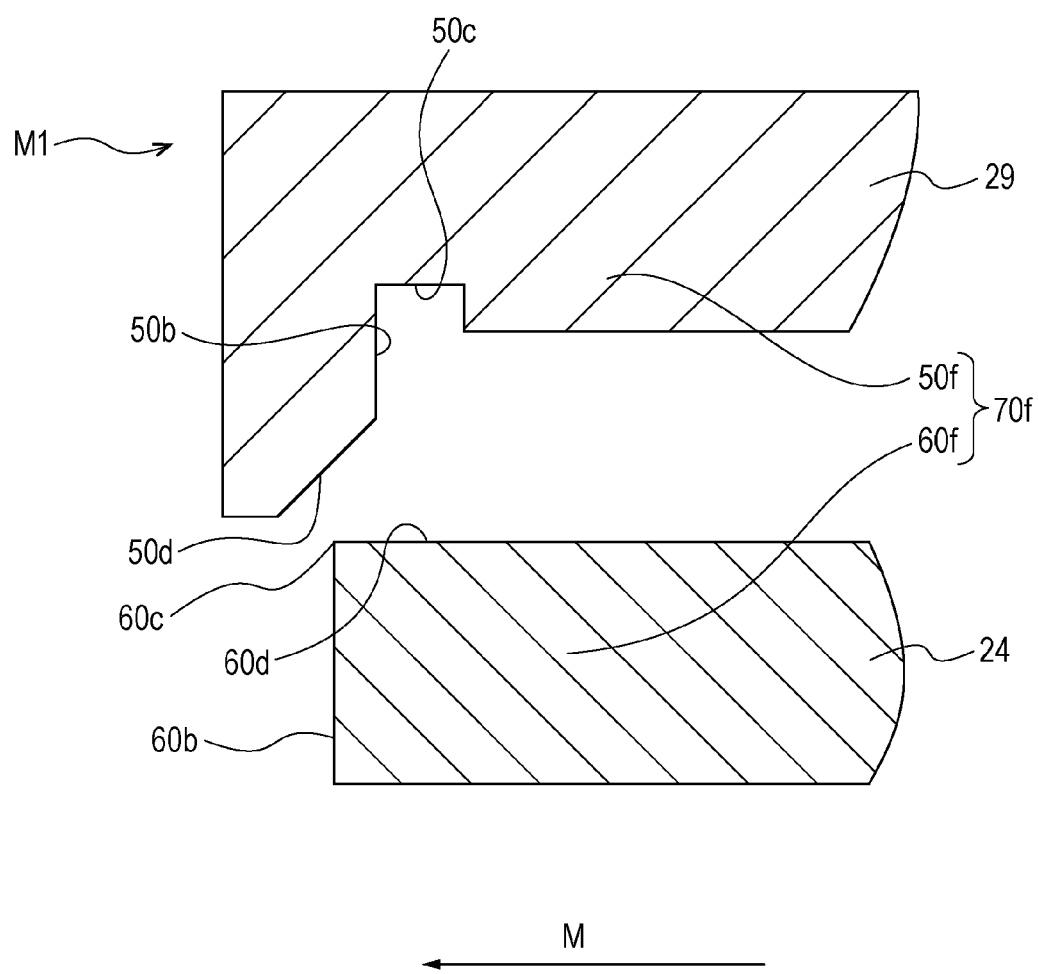
FIG. 6 is a cross-sectional view taken along line VI-VI in FIG. 1, to illustrate a configuration of a first edge-portion adhering portion.

FIG. 5 is a cross-sectional view taken along line V-V in FIG. 1 to describe a configuration of the first adhering portion 70. FIG. 6 is a cross-sectional view taken along line VI-VI in FIG. 1 to describe a configuration of the first end adhering portion 70f which is an end portion of the first adhering portion 70.

As illustrated in FIG. 5, the cross-section of the recessed adhering portion 50 is in a concave shape. Also, the recessed adhering portion 50 is made up of a positioning inner side face 50a serving as a positioning portion that performs positioning of the developer frame 24 as to the toner container lid 29, a inner side face 50b serving as a first adhering joining portion, a floor face 50c serving as the recess floor portion, a sloped face 50d, and an opening portion 50e. The sloped face 50d is provided in a direction such that the width W of the recess opening of the opening portion 50e is wider than the width Y of the recess portion floor face. The positioning inner side face 50a is provided within the recess portion, whereby positioning and adhering can be performed in an integrated manner.

Also, the cross-section of the adhesion-receiving protruding portion 60 is in a protruding shape. Also, the adhesion-receiving protruding portion 60 has a positioned face (positioned outer side face) 60a that serves as a positioned portion in a case of performing positioning of the developer frame 24 as to the toner container lid 29. Also, the adhesion-receiving protruding portion 60 is made up of an outer side face 60b serving as a first adhesion-receiving protruding portion, and an edge face 60d serving as a protruding edge portion. The edge face 60d has a portion 60c that abuts against the sloped face 50d at the time of adhering. The positioned face (positioned outer side face) 60a faces the positioning inner side face 50a, the outer side face 60b faces the inner side face 50b, and the edge face 60d faces the floor face 50c. The width X of the protruding portion edge is greater than the width Y of the recess portion floor face in a recessed form, and is smaller than the width W of the recess opening of the opening portion 50e. That is to say, W>X>Y holds true.

Next, a configuration of the first end adhering portion 70f will be described with reference to FIG. 6. As illustrated in FIG. 6 which is a cross-sectional diagram taken along line VI-VI in FIG. 1, the recessed end adhering portion 50f which is the end portion of the recessed adhering portion 50, has the inner side face 50b, floor face 50c, and sloped face 50d extended to the outer side in the lengthwise direction N, farther than the positioning inner side face 50a. Also, similarly with the protruding end adhering portion 60f, which is the end portion of the protruding adhering portion 60, the outer side face 60b and the edge face 60d are extended to the outer side in the lengthwise direction N, farther than the positioned face (positioned outer side face) 60a.

Configuration of Second Adhering Portion

Next, the second adhering portion 71 that is formed with the protruding adhering portion 51 and flat adhering portion 61 will be described with reference to FIG. 7.

The second adhering portion is made up of the protruding adhering portion 51 and the flat adhering portion 61 that has a flat face, which have been welded together, as described in detail later.

Figure 7:
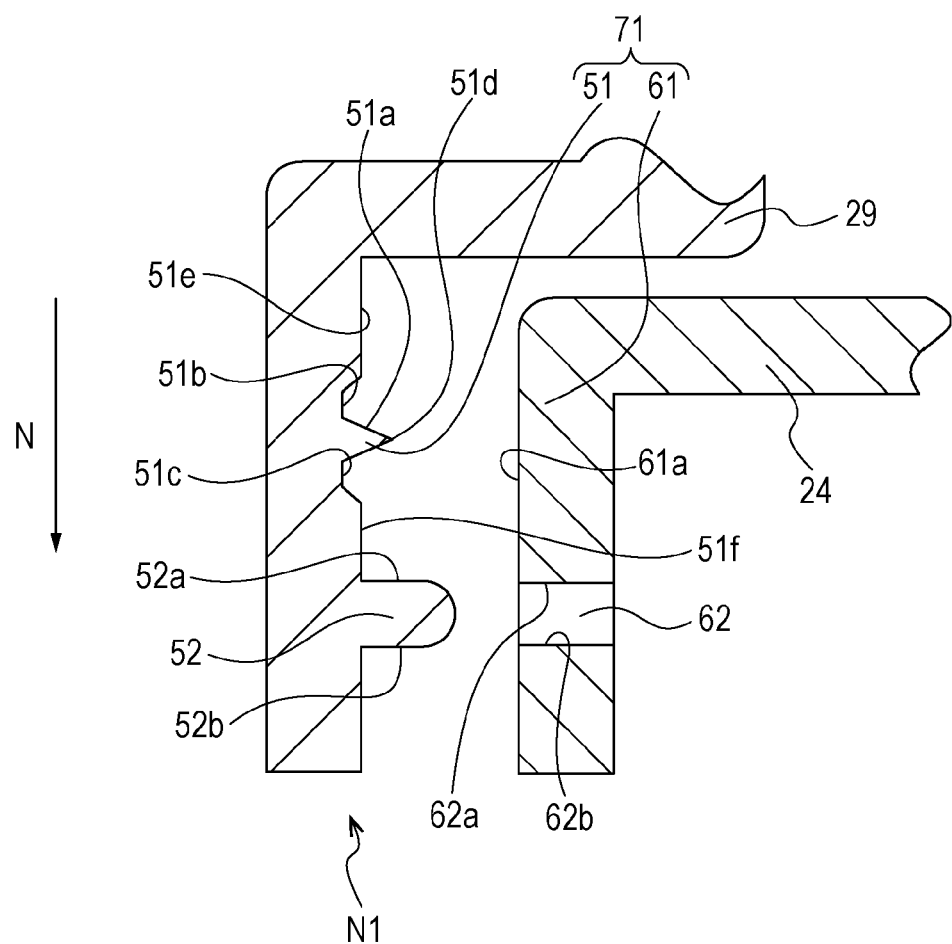
FIG. 7 is a cross-sectional view taken along line VII-VII in FIG. 1, to illustrate a configuration of a second adhering portion.

FIG. 7 is a cross-sectional view taken along line VII-VII in FIG. 1 to illustrate a configuration of the second adhering portion 71.

As illustrated in FIG. 7, the protruding adhering portion 51 has a protrusion 51a, the cross-section of which forms a triangle, grooves 51b and 51c on both sides of the protrusion for melted material to flow into, and flat portions 51e and 51f on both outer sides of the grooves. Also, the flat adhering portion 61 has a flat portion 61a that abuts against the protrusion 51a.

Configuration of Sealing Member

Next, a configuration of the sealing member 55a will be described with reference to FIG. 8.

Figure 8:
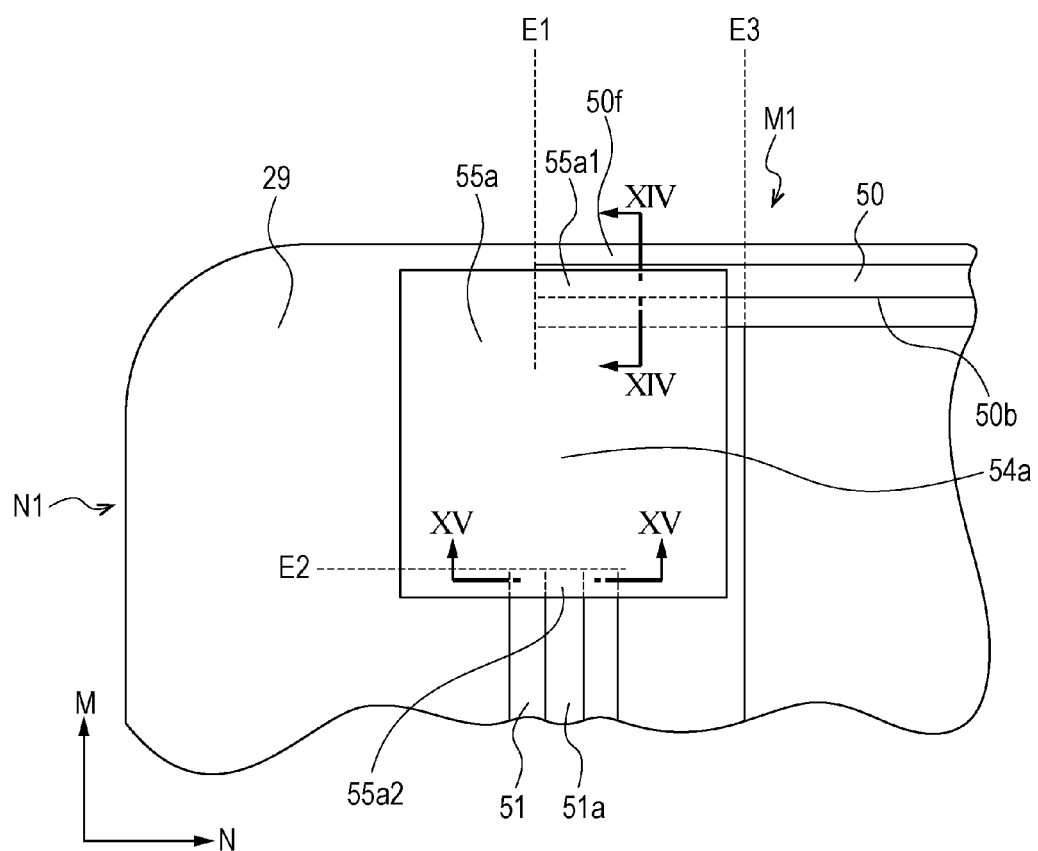
FIG. 8 is a front view to illustrate a configuration of a sealing member.

FIG. 8 is a front view to illustrate the positional relation of the sealing member 55a that is attached to the developer frame 24 and the recessed end adhering portion 50f and protruding adhering portion 51 of the developer container lid 29.

As illustrated in FIG. 8, the recessed end adhering portion 50f provided to the one end side M1 in the transverse direction M and the protruding adhering portion 51 provided to the one end side N1 in the lengthwise N direction do not intersect, and a space 54a is provided between the recessed end adhering portion 50f and the protruding adhering portion 51. The sealing member 55a is disposed across the recessed end adhering portion 50f and the protruding adhering portion 51. At this time, an overlapping portion 55a1 that overlaps the inner side face 50b of the recessed end adhering portion 50f is provided to the sealing member 55a. Also, an overlapping portion 55a2 that overlaps the protrusion 51a of the protruding adhering portion 51 is provided.

The sealing member 55a provided to the one end side N1 in the lengthwise direction N of the toner container lid 29 has been described here, but the sealing member 55b provided to the other end side N2 in the lengthwise direction N of the toner container lid 29 also has the same configuration.

Note that the first adhering portion formed by the recessed adhering portion adhering refers to the adhering part from one end (E1) of the recessed adhering portion to the other end. On the other hand, the second adhering portion formed by the protruding adhering portion 51 adhering refers to the adhering part from one end (E2) of the protruding adhering portion 51 to the other end. The recessed end adhering portion 50f refers to the part from the end (E1) of the recessed adhering portion to E3.

Adhering Method for Developer Container

Next, a method to adhere the toner container lid 29 and the developer frame 24 will be described with reference to FIGS. 9 through 17.

Figure 9:
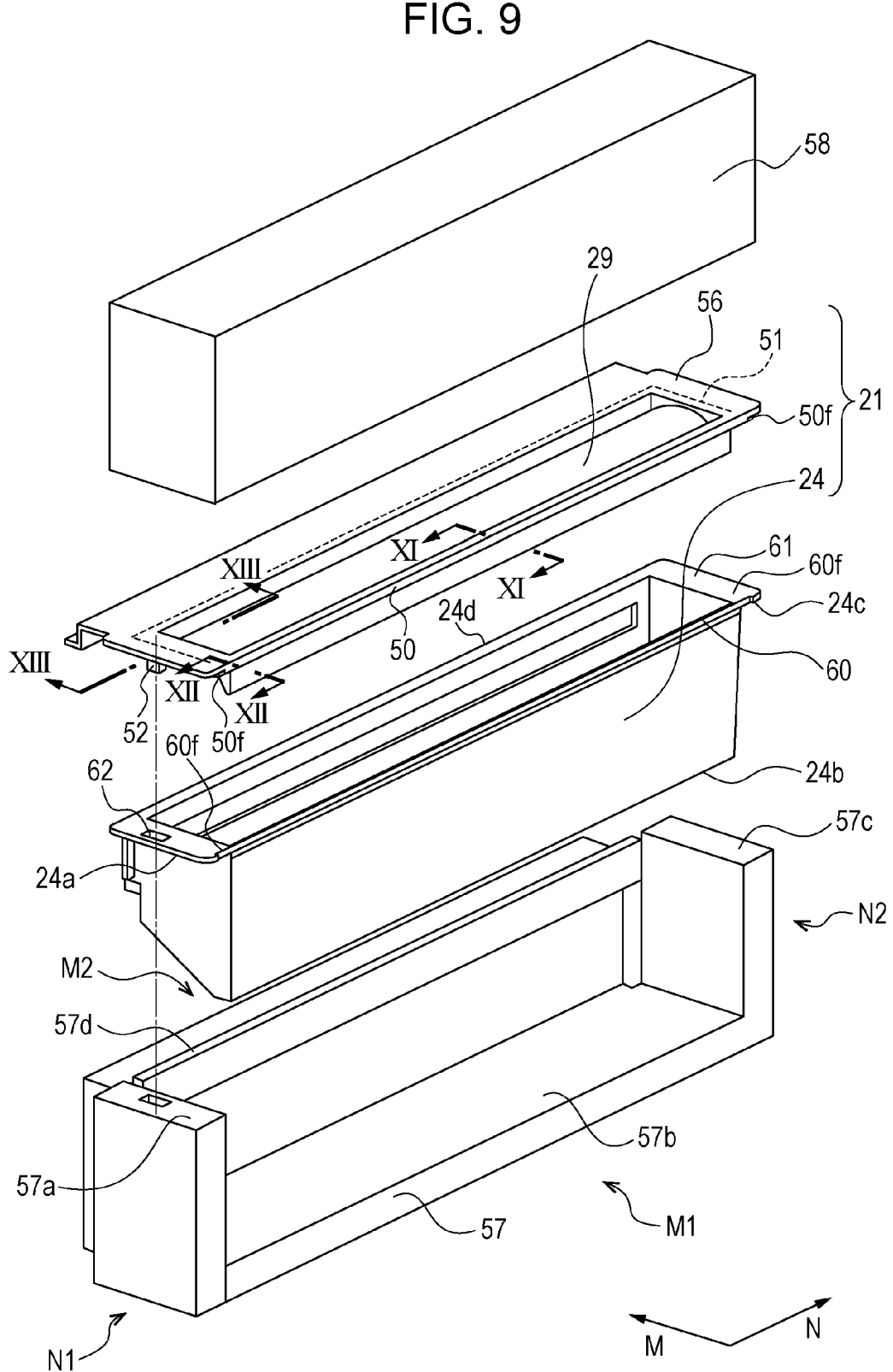
FIG. 9 is a perspective view to illustrate a method to adhere the toner container lid and the developer frame.

FIG. 9 is a perspective view to illustrate a method to adhere the toner container lid 29 and the developer frame 24.

Figure 10:
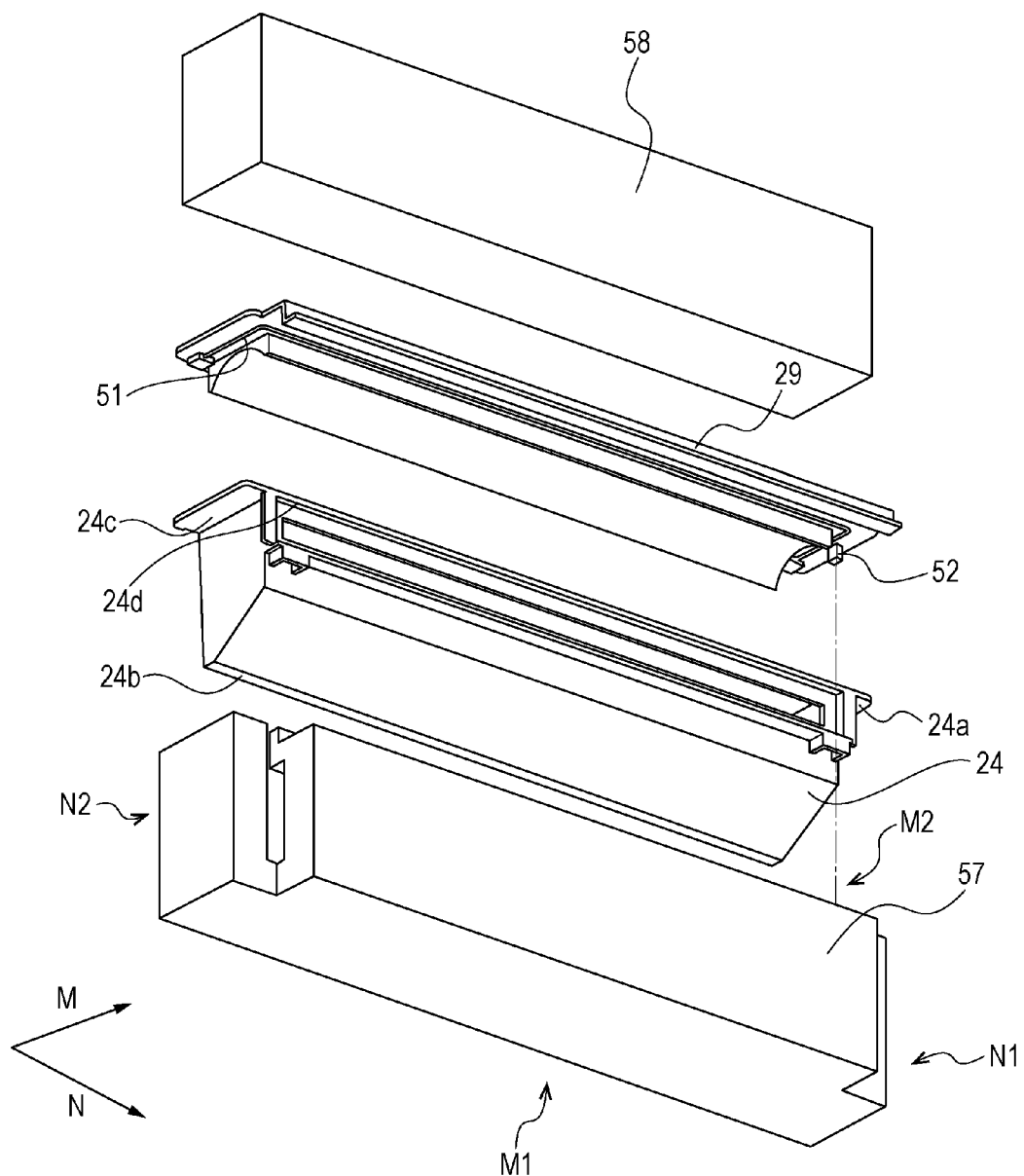
FIG. 10 is a perspective view to illustrate a method to adhere the toner container lid and the developer frame.

FIG. 10 is a perspective view to illustrate a method to adhere the toner container lid 29 and the developer frame 24.

Figure 11A:
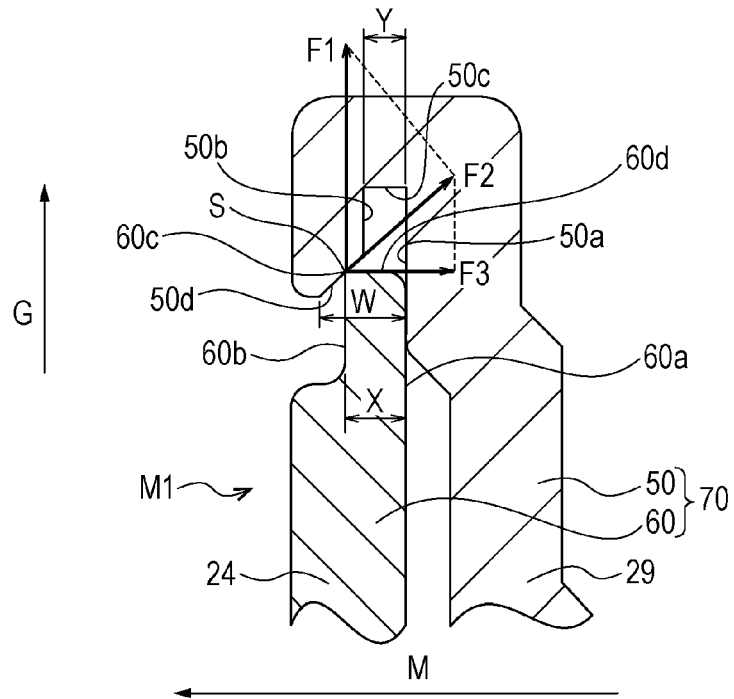
FIGS. 11A and 11B are cross-sectional diagrams to illustrate a method to adhere the first adhering portion.
Figure 11B:
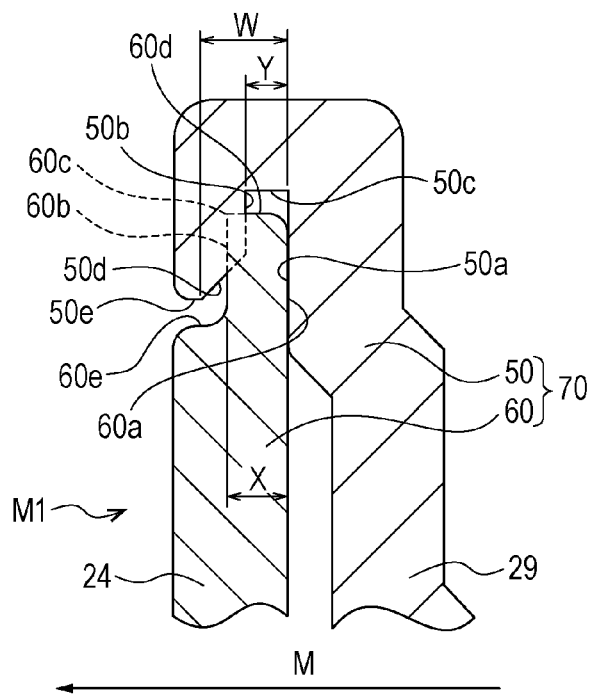

FIGS. 11A and 11B are cross-sectional diagrams taken along line XI-XI in FIG. 9, to illustrate a method to adhere the first adhering portion 70. FIG. 11A is a cross-sectional diagram to illustrate a state wherein the recessed adhering portion 50 and adhesion-receiving protruding portion 60 abut against each other, and are in the state immediately prior to being adhered together. FIG. 11B is a cross-sectional diagram to illustrate a state following the recessed adhering portion 50 and adhesion-receiving protruding portion 60 having been adhered together.

Figure 12A:
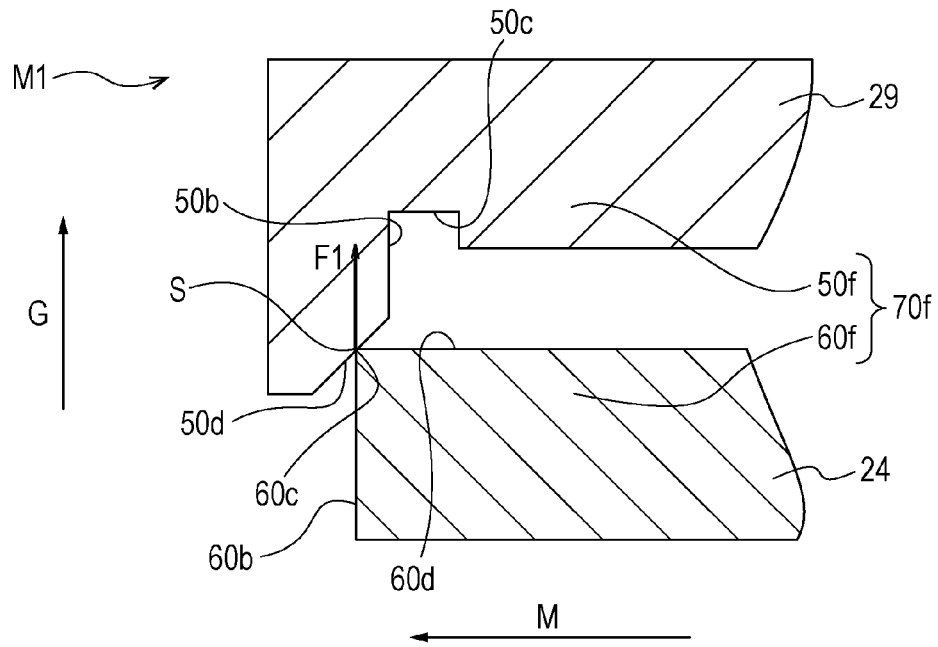
FIGS. 12A and 12B are cross-sectional diagrams to illustrate a method to adhere the first edge-portion adhering portion.
Figure 12B:
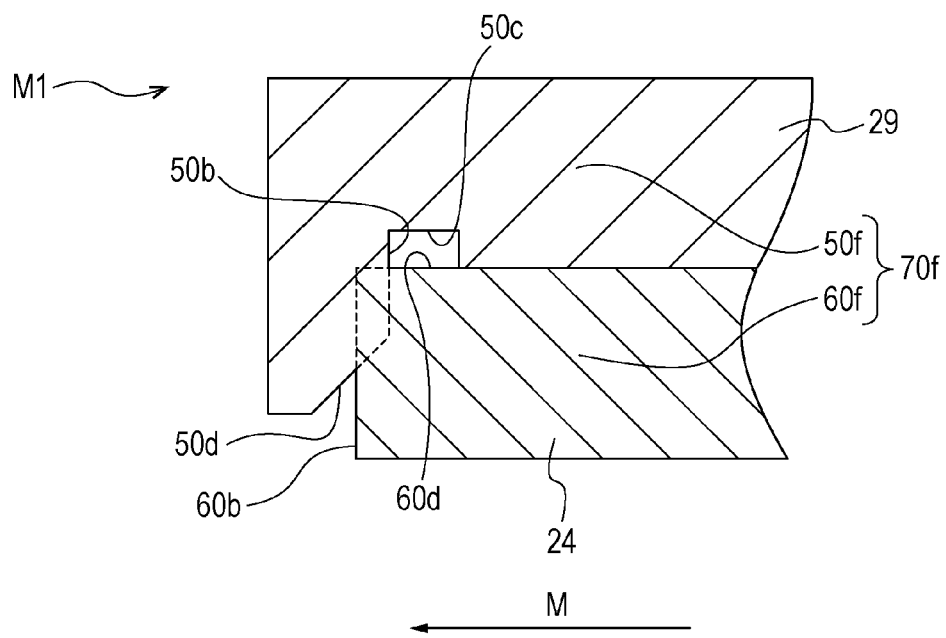

FIGS. 12A and 12B are cross-sectional diagrams taken along line XII-XII in FIG. 9, to illustrate a method to adhere the first end-portion adhering portion 70f. FIG. 12A is a cross-sectional diagram to illustrate a state wherein the recessed end adhering portion 50f and adhesion-receiving protruding end portion 60f abut against each other, and are in the state immediately prior to being adhered. FIG. 12B is a cross-sectional diagram to illustrate a state following the recessed end adhering portion 50f and adhesion-receiving protruding end portion 60f having been adhered together.

Figure 13A:
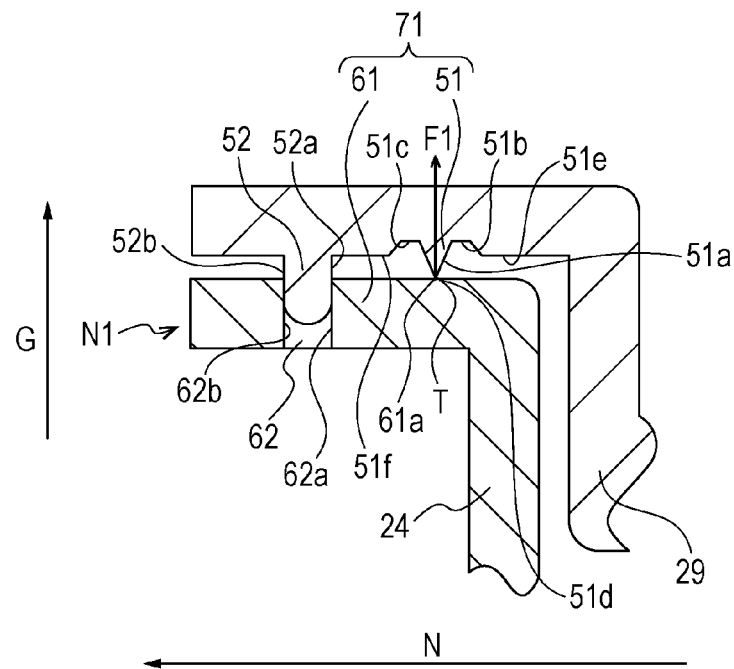
FIGS. 13A and 13B are cross-sectional diagrams to illustrate a method to adhere the second adhering portion.
Figure 13B:
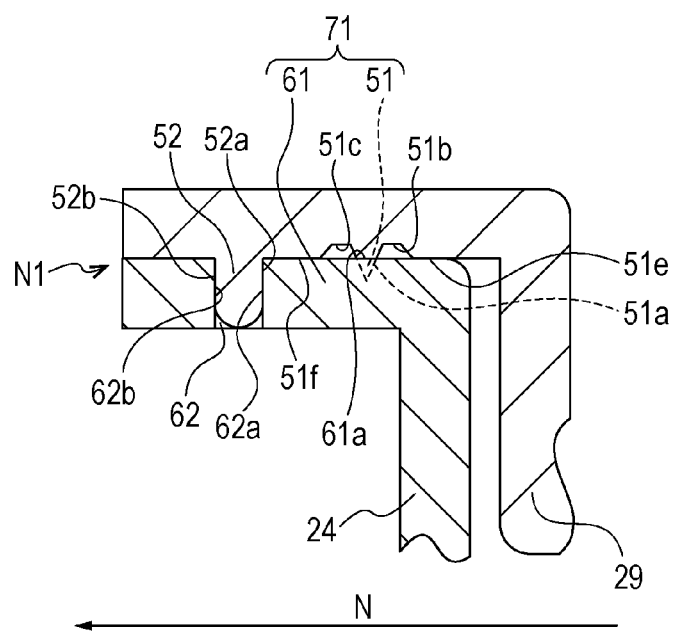

FIGS. 13A and 13B are cross-sectional diagrams taken along line XIII-XIII in FIG. 9, to illustrate a method to adhere the second adhering portion 17. FIG. 13A is a cross-sectional diagram to illustrate a state wherein the protruding adhering portion 51 and flat adhering portion 61 abut against each other, and are in the state immediately prior to being adhered. FIG. 13B is a cross-sectional diagram to illustrate a state following the protruding adhering portion 51 and flat adhering portion 61 having been adhered together.

Figure 14A:
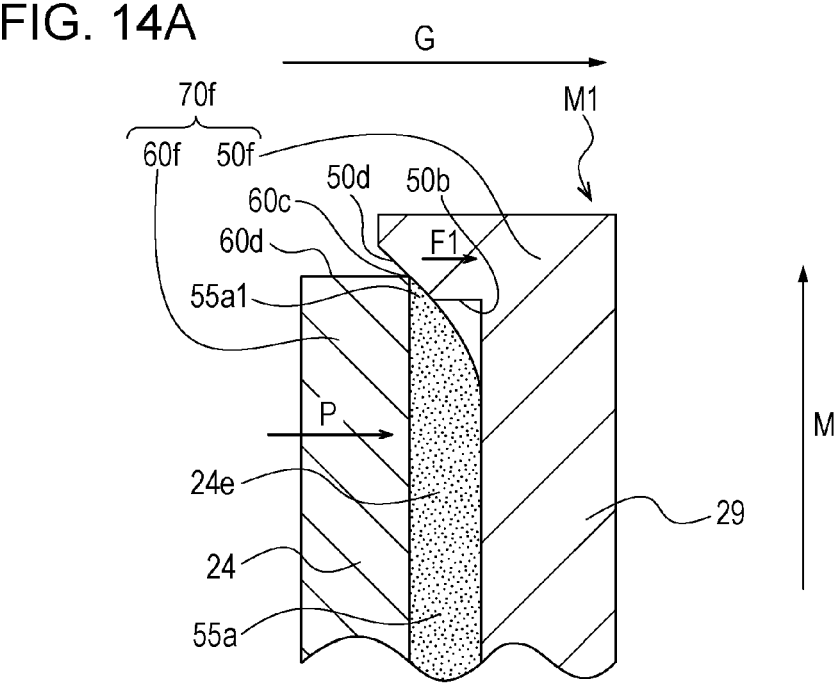
FIGS. 14A and 14B are cross-sectional diagrams to illustrate a method to adhere the sealing member and an overlapping portion between the first adhering portion and second adhering portion.
Figure 14B:
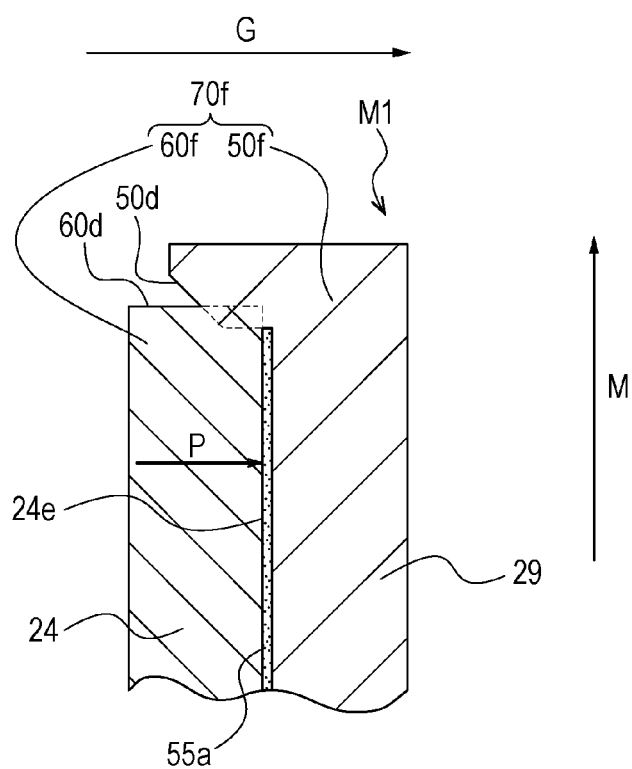

FIGS. 14A and 14B are cross-sectional diagrams taken along line XIV-XIV in FIG. 8, to illustrate a method to adhere an overlapping portion 55a1 between the sealing member 55a and the first end adhering portion 70f. FIG. 14A is a cross-sectional diagram to illustrate a state wherein the recessed end adhering portion 50f and adhesion-receiving protruding end portion 60f abut against each other, and are in the state immediately prior to the adhering starting. FIG. 14B is a cross-sectional diagram to illustrate a state following completion of adhering together of the recessed end adhering portion 50f and adhesion-receiving protruding end portion 60f.

Figure 15A:
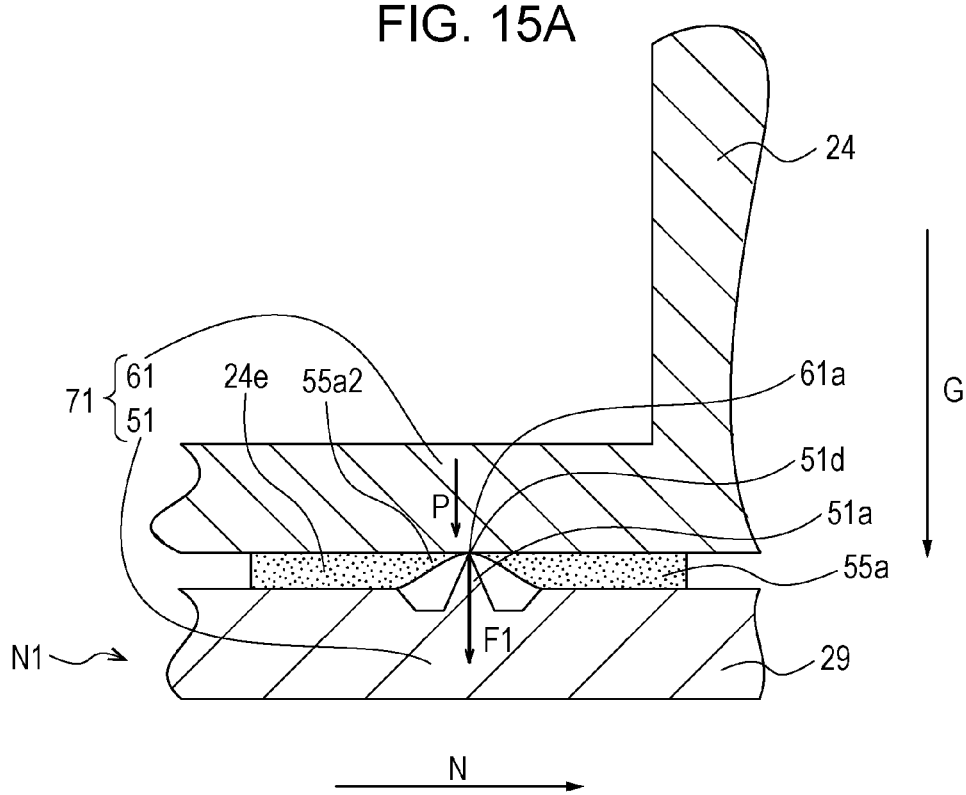
FIGS. 15A and 15B are cross-sectional diagrams to illustrate a method to adhere the sealing member and an overlapping portion between the first adhering portion and second adhering portion.
Figure 15B:
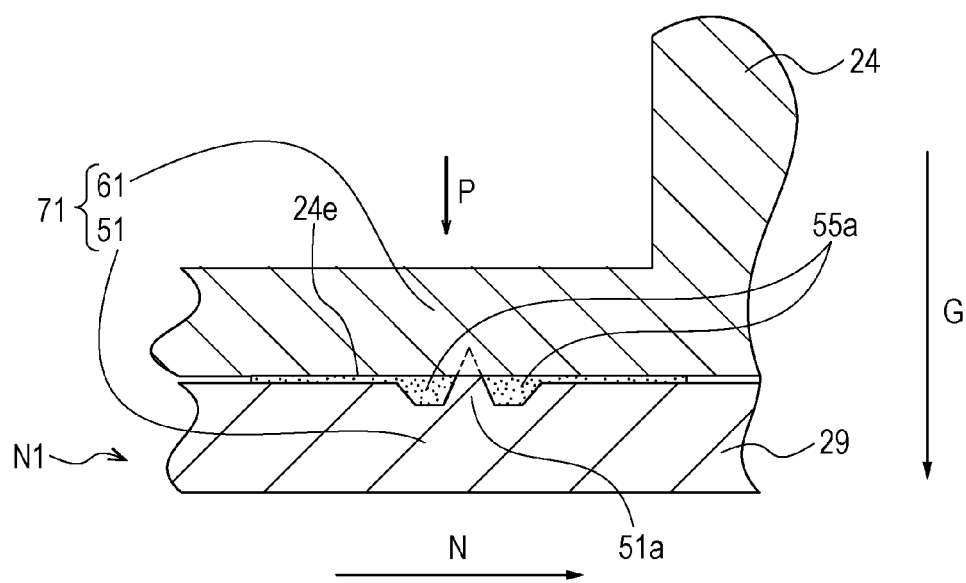

FIGS. 15A and 15B are cross-sectional diagrams taken along line XV-XV in FIG. 8, to illustrate a method to adhere an overlapping portion 55a2 between the sealing member 55a and the second adhering portion 71. FIG. 15A is a cross-sectional diagram to illustrate a state wherein the protruding adhering portion 51 and the flat adhering portion 61 abut against each other, and are in the state immediately prior to the adhering starting. FIG. 15B is a cross-sectional diagram to illustrate a state following completion of adhering together of the protruding adhering portion 51 and the flat adhering portion 61.

Figure 16A:
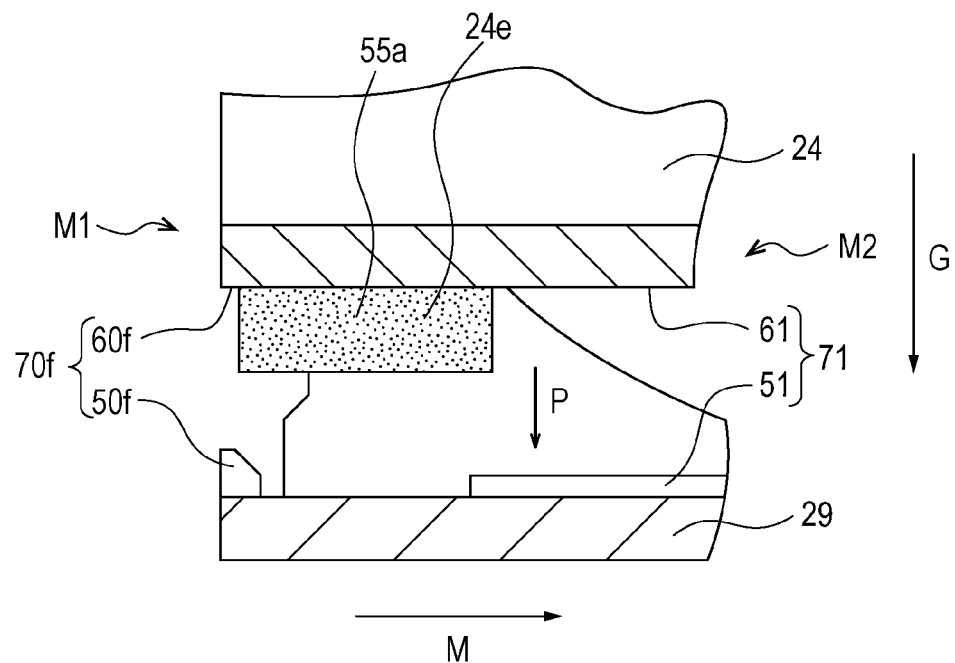
FIGS. 16A and 16B are diagrams to illustrate a configuration of the sealing member between the first adhering portion and second adhering portion.
Figure 16B:
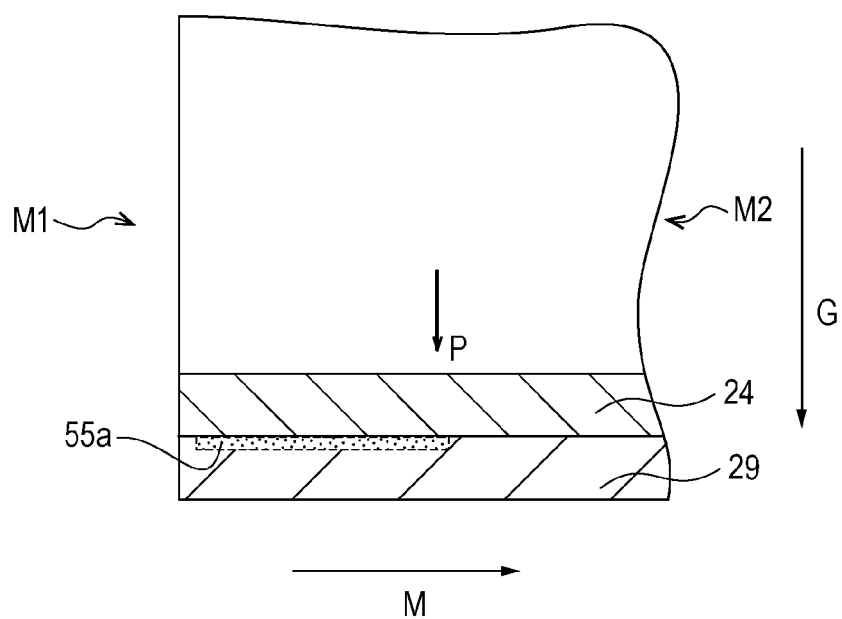

FIGS. 16A and 16B are diagrams to illustrate a configuration of the sealing member 55 between the first adhering portion 70 and second adhering portion 71. FIG. 16A is a diagram to describe a state prior to the start of adhering. FIG. 16B is a diagram to describe a state wherein the adhering is completed.

Figure 17:
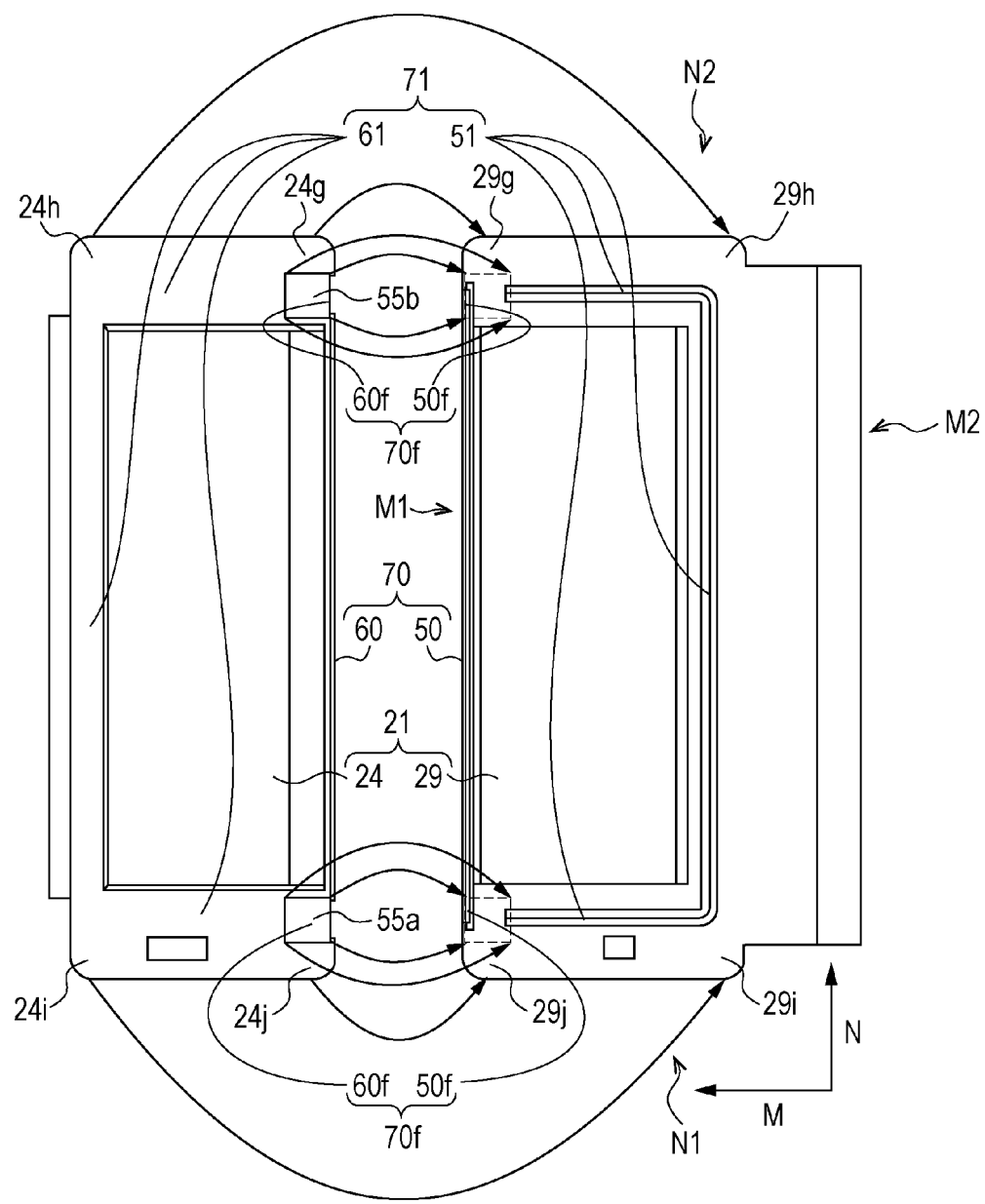
FIG. 17 is a diagram to illustrate a configuration to inhibit toner in the developer container from spilling out.

FIG. 17 is a diagram to illustrate a configuration to inhibit toner in the developer container 21 from spilling out.

As illustrated in FIGS. 9 and 10, an adhering horn contact surface 56 is provided to the recessed adhering portion 50 of the toner container lid 29 and the back surface of the protruding adhering portion 51 (the position on the back surface of the adhering horn contact surface 56 is indicated by a dotted line in the diagram). Also, a first adhesion-receiving portion 24a, which is a received face at the time of adhesion, and a second adhesion-receiving portion 24b, which is a second received face at the time of adhesion, are provided to the developer frame 24. Also, a third adhesion-receiving portion 24c, which is a third received face at the time of adhesion, and a fourth adhesion-receiving portion 24d, which is a fourth received face at the time of adhesion, are provided.

At the time of adhesion, the first adhesion-receiving portion 24a is supported by the first adhesion receiving portion 57a of an adhesion cradle 57, the second adhesion-receiving portion 24b is supported by the second adhesion receiving portion 57b, the third adhesion-receiving portion 24c is supported by the third adhesion receiving portion 57c, and the fourth adhesion-receiving portion 24d is supported by the fourth adhesion receiving portion 57d.

Thus, in a case of adhering the recessed adhering portion 50 and the protruding adhering portion 60, the second adhesion-receiving portion 24b that is separated from the adhering portion is supported by the second adhesion receiving portion 57b.

Also, in a case of adhering the protruding adhering portion 51 and the flat adhering portion 61, the first adhesion-receiving portion 24a that is near the adhering portion is supported by the first adhesion receiving portion 57a, the third adhesion-receiving portion 24c is supported by the third adhesion receiving portion 57c, and the fourth adhesion-receiving portion 24d is supported by the fourth adhesion receiving portion 57d.

Thus, the toner container lid 29 (e.g. a first frame) and developing frame (e.g. second frame) are prepared, and preparation is made for receiving vibrations of ultrasonic waves with the prepared toner container lid 29 or developing frame and adhesion receiving portion or adhesion-receiving portion. A developer container is manufactured by ultrasonic wave welding using the above-described method. The manufactured developer container has provided a positioning inner-side face within the recessed portion, whereby a separate positioning portion does not have to be provided, enabling reduction in size.

Adhering Method of First Adhering Portion

Next, an adhering method of the first adhering portion 70 will be described with reference to FIGS. 11A and 11B.

As illustrated in FIG. 11A, the recessed adhering portion 50 and the adhesion-receiving protruding portion 60 are pressed together in the arrow G direction, whereby an abutting portion 60c provided to the tip of the outer side face 60b and a sloped face 50d abut against each other. At this time, force F1 in the arrow G direction at the abutting portion 60c is restricted by the sloped face 50d, whereby force F2 arises which follows the sloped face 50d. A pushing force F3, which is a component force that is orthogonal to the arrow G direction of the force F2, arises at the abutting portion 60c. Therefore, the positioned outer side face 60a is pressed by the positioning inner side face 50a, whereby the position in the transverse direction M of the developer frame 24 as to the toner container lid 29 is determined. While in this state, ultrasonic wave vibration is applied at the same time that force F1 is applied in the arrow G direction, whereby heat is generated from the shape distortion of the abutting portion 60c and an abutting portion S of the sloped face 50d. This heat generation causes the inner side face 50b and the outer side face 60b to melt, and the spaces are reduced between the floor face 50c of the recessed adhering portion 50 and the edge face 60d of the adhesion-receiving protruding portion 60 in the arrow G direction.

Consequently, as illustrated in FIG. 11B, the inner side face 50b and the outer side face 60b melt while the positioning inner side face 50a and the positioned outer side face 60a of the toner container lid 29 and the developer frame 24 are abutted against each other. Upon application of the ultrasonic wave vibration stopping, heat generation from the vibrations lessens, and the inner side face 50b and the outer side face 60b are welded together. Also, by causing the positioning inner side face 50a and the positioned outer side face 60a of the toner container lid 29 and the developer frame 24 to abut against each other from the pressing force F3 that is generated by the force F1 in the arrow G direction, as described above, positioning in the transverse direction M is performed during the adhering and after adhering has been completed. Depending on the material used, there may be cases where a portion of the positioning inner side face 50a and the positioned outer side face 60a are melted from the ultrasonic wave vibrations.

Next, an adhering method of the first end adhering portion 70f will be described with reference to FIGS. 12A and 12B.

Now, positioning in the transverse direction M of the toner container lid 29 and developer frame 24 of the first end adhering portion 70f is performed by causing the above-described positioning inner side face 50a of the first adhering portion 70 and the positioned outer side face 60a to abut against each other.

As illustrated in FIG. 12A, the recessed end adhering portion 50f and the adhesion-receiving protruding end portion 60f are pressurized in the arrow G direction, whereby the abutting portion 60c, which is provided to the tip of the outer side face 60b, and the sloped face 50d, are abutted against each other.

While in this state, ultrasonic wave vibration is applied at the same time that force F1 is applied in the arrow G direction, whereby heat is generated from the shape distortion of the abutting portion 60c and the abutting portion S of the sloped face 50d. This heat generation causes the inner side face 50b and the outer side face 60b to melt, and the spaces are reduced between the floor face 50c of the recessed adhering portion 50 and the edge face 60d of the adhesion-receiving protruding portion 60 in the arrow G direction.

Consequently, as illustrated in FIG. 12B, the inner side face 50b and the outer side face 60b melt. Upon application of the ultrasonic wave vibration stopping, heat generation from the vibrations lessens, and the inner side face 50b and the outer side face 60b are welded together.

A joint such as that described above may be called a shared joint.

Adhering Method of Second Adhering Portion

Next, an adhering method of the second adhering portion 71 will be described with reference to FIGS. 13A and 13B.

As illustrated in FIG. 13A, by pressurizing the protruding adhering portion 51 and the flat adhering portion 61 together in the arrow G direction, the apex 51d of the protrusion 51a and the flat portion 61a abut against each other. At this time, the lengthwise direction faces 52a and 52b of the boss portion 52 and the lengthwise direction faces 62a and 62b of the hole 62 fit together, whereby the position in the lengthwise direction N is determined. While in this state, ultrasonic wave vibration is applied at the same time that force F1 is applied in the arrow G direction, whereby heat is generated from the shape distortion of the protrusion 51a and abutting portion T of the flat portion 61a. This heat generation causes the protrusion 51a and flat portion 61a to melt, and the spaces are reduced between the flat portions 51e and 51f of the protruding adhering portion 51 and the flat portion 61a of the flat adhering portion 61 in the arrow G direction. At this time, the melted resin of the protrusion 51a and flat portion 61a flow into the grooves 51b and 51c, whereby the flat portions 51e and 51f of the protruding adhering portion 51 and the flat portion 61a of the flat adhering portion 61 can be tightly adhered to each other.

Consequently, as illustrated in FIG. 13B, the protrusion 51a and flat portion 61a of the toner container lid 29 and the developer frame 24 melt. Upon application of the ultrasonic wave vibration stopping, heat generation from the vibrations lessens, and the protrusion 51a and flat portion 61a are welded together. At this time, the positions in the lengthwise direction N of the toner container lid 29 and developer frame 24 are not determined by the second adhering portion 71, and the position in the lengthwise direction N are determined by positioning from the fitting of the boss portion 52 and hole 62 described above.

Comparing the second adhering portion and first adhering portion described above, having the first adhering portion enables the boss portion 52 to be omitted, and a smaller developer container can be made.

Configuration Between First and Second Adhering Portions

The first and second adhering portions have different cross-sectional shapes so if formed next to each other, the design of the adjacent portion becomes complex. Therefore, the space between the first end adhering portion 70f of the first adhering portion and the second adhering portion 71 may be sealed using sealing members 55a and 55b. Thus, design complications may be avoided. Also, while described later, a first end adhering portion, which is the first adhering portion, and a second adhering portion may be formed adjacent to each other. In this case, sealing portions are not used, so airtightness can be increased.

A case of using sealing members will be described in detail below.

Next, a method to adhere the overlapping portion 55a1 of the sealing member 55a and inner side face 50b will be described with reference to FIGS. 14A and 14B. In order to describe the state of the sealing member 55a being sandwiched between the toner container lid 29 and developer frame 24, the cross-sectional portion of the sealing member 55a is shaded in the diagram. As illustrated in FIG. 14A, the sealing member 55a is attached to a sealing member attaching portion 24e of the developer frame 24. The toner container lid 29 and developer frame 24 are pressurized in the arrow G direction at the overlapping portion 55a1 of the sealing member 55a and the inner side face 50b of the recessed end adhering portion 50f. By this pressurization, the abutting portion 60c and the sloped face 50d are abutted against each other while the sealing member 55a is compressed in the thickness direction P. Subsequently, while in the state of the overlapping portion 55a1 being sandwiched, ultrasonic wave vibrations are applied at the same time that force F1 is applied to the abutting portion 60c towards the sloped face 50d in the arrow G direction, whereby heat is generated from the shape distortion of the abutting portion 60c and the abutting portion of the sloped face 50d. This heat generation causes the inner side face 50b and the outer side face 60b melt. Simultaneously, the sealing member 55a that is sandwiched between the inner side face 50b and the outer side face 60b also melts. As illustrated in FIG. 14B, the sealing member 55a is in a compressed state in the thickness direction P. Upon application of the ultrasonic wave vibration stopping, heat generation from the vibrations lessens, and the inner side face 50b and the outer side face 60b are welded together.

Next, a method to adhere the overlapping portion 55a2 of the sealing member 55a and protrusion 51a will be described with reference to FIGS. 15A and 15B. In order to describe the state of the sealing member 55a being sandwiched between the toner container lid 29 and developer frame 24, the cross-sectional portion of the sealing member 55a is shaded in the diagram. As illustrated in FIG. 15A, the sealing member 55a is attached to the sealing member attaching portion 24e of the developer frame 24. The toner container lid 29 and developer frame 24 are pressurized in the arrow G direction at the overlapping portion 55a2 of the sealing member 55a and the protrusion 51a of the protruding adhering portion 51, whereby the apex 51d of the protrusion 51a and the flat portion 61a are abutted against each other while the sealing member 55a is compressed in the thickness direction P. Subsequently, while in the state of the overlapping portion 55a2 being sandwiched, ultrasonic wave vibrations are applied at the same time that force F1 is applied in the arrow G direction, whereby heat is generated from the shape distortion of the abutting portion T of the protrusion 51a and flat portion 61a. This heat generation causes the protrusion 51a and flat portion 61a melt. Simultaneously, the sealing member 55a that is sandwiched between the protrusion 51a and flat portion 61a also melts. As illustrated in FIG. 15B, the sealing member 55a is in a compressed state in the thickness direction P. Upon application of the ultrasonic wave vibration stopping, heat generation from the vibrations lessens, and the protrusion 51a and flat portion 61a are welded together.

Next, a configuration of the sealing member 55a between the first end adhering portion 70f and the second adhering portion 71 will be described with reference to FIGS. 16A and 16B. In order to describe the state of the sealing member 55a being sandwiched between the toner container lid 29 and developer frame 24, the cross-sectional portion of the sealing member 55a is shaded in the diagram. As illustrated in FIG. 16A, the sealing member 55a is attached to the sealing member attaching portion 24e of the developer frame 24, at the portion between the recessed end adhering portion 50f and the protruding adhering portion 51. The toner container lid 29 and developer frame 24 are pressurized in the arrow G direction, whereby the sealing member 55a is compressed in the thickness direction P while the toner container lid 29 and developer frame 24 are in a mutually adhered state, as illustrated in FIG. 16B.

According to the configurations described above, spaces do not occur in the joined portions between the toner container lid and developer frame because of the sealing member 55a and 55b that are disposed so as to overlap over the first adhering portion, first end adhering portion, second adhering portion and the first end adhering portion and second adhering portion.

Therefore, in a case where the toner container lid 29 and the developer frame 24 are joined, a space does not occur between the toner container lid 29 and the developer frame 24. Accordingly, outflow of toner t from the developer container 21 that is made up of the toner container lid 29 and the developer frame 24 can be inhibited.

The sealing member 55a here may be a foaming elastic member, or may be an elastic member such as a flexible rubber or elastomer or the like.

Features of Developer Container

According to the configurations described above, positioning in the transverse direction M of the toner container lid 29 and developer frame 24 can be performed with the first adhering portion 70 with an abutting portion having no fitting gaps. Therefore, according to a configuration having a fitting gap in the positioning portion in the transverse direction M, space to allow for the fitting gap does not have to be provided in the case of performing positioning in the transverse direction M of the toner container lid 29 and developer frame 24, whereby the size of the adhering portion can be reduced. Since there is no deviation between frames resulting from fitting gaps in the transverse direction M of the toner container lid 29 and developer frame 24, accuracy of dimension of appearance of the developer container 21 is improved.

Also, in a case of adhering the first adhering portion 70 which is made up of the recessed adhering portion 50 and the protruding adhering portion 60, the second adhesion-receiving portion 24b that is separated from the adhering portion is supported by the second adhering receiving portion 57b, whereby there is no adhering receiving portion near the adhering portion. Therefore, a flange-shaped first adhesion-receiving portion 24a, third adhesion-receiving portion 24c, and fourth adhesion-receiving portion 24d that is necessary to adhere the second adhering portion 71, which is made up of the protruding adhering portion 51 and the flat adhering portion 61, becomes unnecessary near the adhering portions, whereby the size of the first adhering portion 70 can be reduced.

Further, according to the present embodiment, positioning in the transverse direction M of the toner container 29 and developer frame 24 is performed by the first adhering portion 70 that is provided on one end side M1 in the transverse direction M of the toner container lid 29. On the other hand, positioning is not performed at the second adhering portion 71, which faces the first adhering portion 70 and is formed on the other end side M2 in the transverse direction M of the toner container lid 29. Now, a minute amount of deviation in the second adhering portion 71 can be allowed, in the range that the protrusion 51a does not separate from the flat portion 61a at the time of adhering. Therefore, even in a case that there is difference in the dimensions between the toner container lid 29 and first adhering portion 70 of the developer frame 24 and the facing second adhering portion 71, adhesion can be performed without deforming the frames of both the toner container lid 29 and the developer frame 24.

The developer container 21 of the processing cartridge 5 has an attaching portion to attach parts such as the attaching portion of the developer blade 23, the attaching portion of the developer bearing 28 that supports the developing roller 22, and the attaching portion of a spill-inhibiting sheet 25. Also, a high degree of positioning accuracy is requested of parts such as the developer blade 23, developing roller 22, and spill-inhibiting sheet 25. Therefore, since the toner container lid 29 and developer frame 24 that make up the developer container 21 are adhered without deforming, the attaching portion of the developer blade 23 is not deformed. Similarly, the attaching portions that attach parts such as the attaching portion of the developer bearing 28 that supports the developing roller 22 and the attaching portion of the spill-inhibiting sheet 25 are not deformed. Therefore, the relative positional relation of the developer blade 23, developing roller 22, and spill-inhibiting sheet 25 are not changed by the adhesion, and image quality is improved.

Also, according to the present embodiment, as illustrated in FIG. 1, positioning in the transverse direction M of the toner container lid 29 and developer frame 24 is performed at the first adhering portion 70, and positioning in the lengthwise direction N is performed with the boss portion 52 and hole 62 provided on the end portion of the one end side N1 in the lengthwise direction N. Therefore, according to conventional configurations, boss portions and hole had to be provided in two locations in order to perform positioning in the transverse direction M and lengthwise direction N of the toner container lid 29 and developer frame 24. Conversely, not only can positioning be performed by providing a boss portion and hole in only one location, but the size of the developer container 21 can be reduced in either the lengthwise direction N or the transverse direction M.

First Modification of First Adhering Portion

A modification of the first adhering portion will be described with reference to FIG. 18.

The description above is of an example wherein the recessed adhering portion 50 provided to the one end side M1 in the transverse direction M of the toner container lid 29 provides a positioning inner side face 50a to the other end side M2 in the transverse direction M, and provides a inner side face 50b to the one end side M1 in the transverse direction M, as illustrated in FIG. 5. However, a configuration may be made wherein the inner side face 50b is provided to the one end side M1 in the transverse direction M and the positioning inner side face 50a is provided to the other end side M2 in the transverse direction M, as indicated in FIG. 18.

Figure 18A:
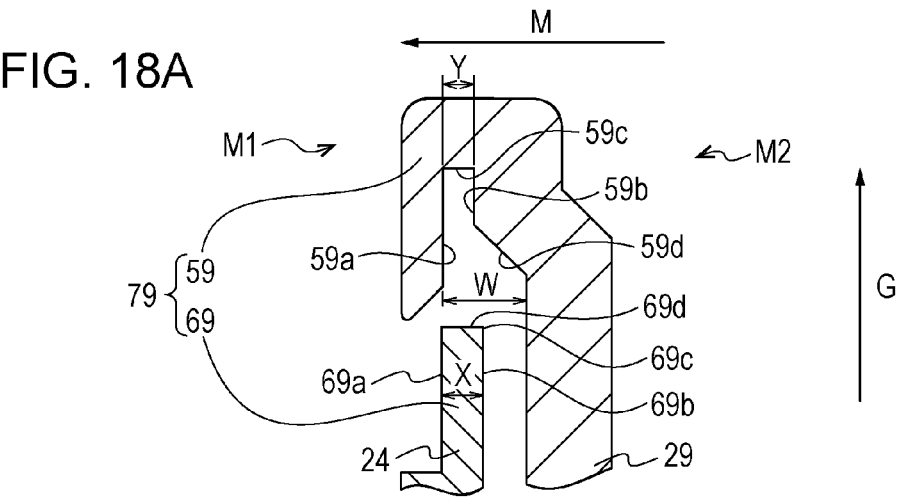
FIGS. 18A through 18C are cross-sectional diagrams to illustrate a modification of the first adhering portion.
Figure 18B:
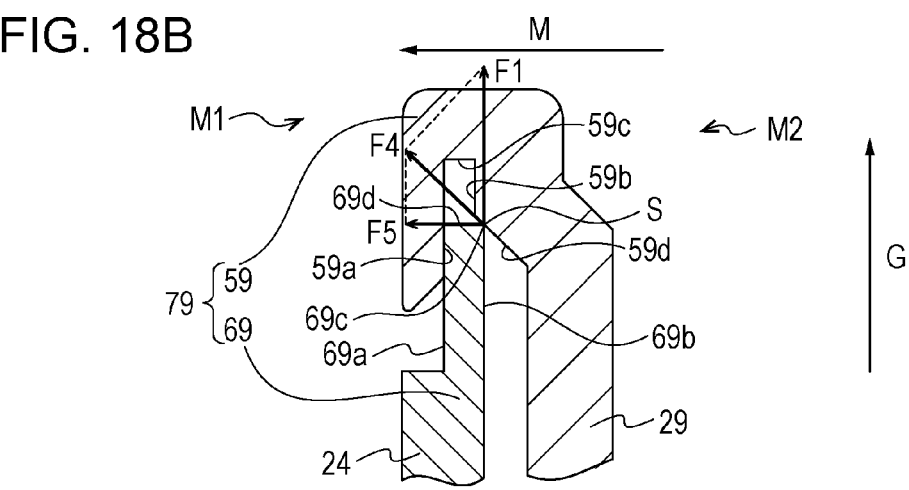
Figure 18C:
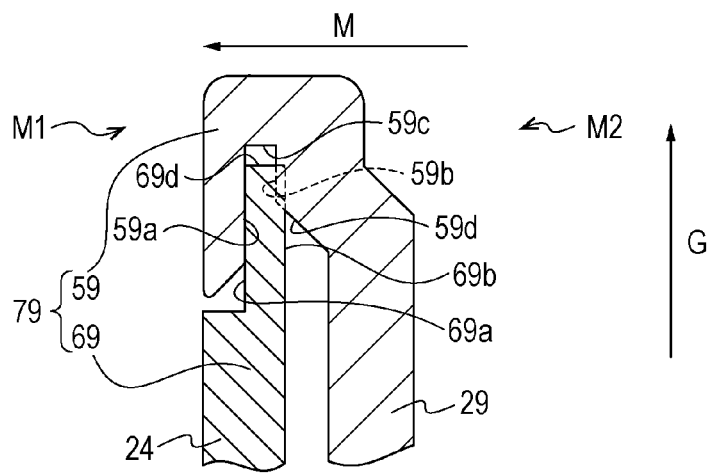

FIGS. 18A through 18C are cross-sectional diagrams to illustrate a modification of a first adhering portion 79. FIG. 18A is a cross-sectional diagram illustrating a state before the recessed adhering portion 59 and adhesion-receiving protruding portion 69 are abutted against each other. FIG. 18B is a cross-sectional diagram illustrating a state wherein the recessed adhering portion 59 and adhesion-receiving protruding portion 69 have abutted against each other and immediately before the start of adhering. FIG. 18C is a cross-sectional diagram illustrating a state wherein the recessed adhering portion 59 and adhesion-receiving protruding portion 69 have completed adhering and wherein the first adhering portion has been formed.

As illustrated in FIG. 18A, the recessed adhering portion 59 has a recessed cross-section, the recessed adhering portion 59 is made up of a positioning inner side face 59a that performs positioning of the developer frame 24 as to the toner container lid 29, an inner side face 59b, floor face 59c, and sloped face 59d. The sloped face 59d is provided in a direction that enables the recessed portion opening width W to be wider than the recessed portion floor face width Y.

Also, the adhesion-receiving protruding portion 69 has a protruding cross-section, and the adhesion-receiving protruding portion 69 is made up of a positioned outer side face 69a in a case of performing positioning of the developer frame 24 as to the toner container lid 29, an outer side face 69b, and edge face 69d. The positioned outer side face 69a faces the positioning inner side face 59a, the outer side face 69b faces the inner side face 59b, and the edge face 69d faces the floor face 59c. The protruding edge width X is greater than the recessed floor face width Y, and is smaller than the recess opening width W. That is to say, W>X>Y holds true.

Next, as illustrated in FIG. 18B, the recessed adhering portion 59 and adhesion-receiving protruding portion 69 are pressed together in the arrow G direction, upon which the abutting portion 69c that is provided to the edge of the outer side face 69b and the sloped face 59d are abutted against each other. At this time, force F1 in the arrow G direction at the abutting portion 69c is restricted by the sloped face 59d, whereby force F4 arises which follows the sloped face 59d. Also, pushing force F5, which is a component force that is orthogonal to the arrow G direction of the force F4, arises at the abutting portion 69c. Therefore, the positioned outer side face 69a is pressed by the positioning inner side face 59a, whereby the position in the transverse direction M of the developer frame 24 as to the toner container lid 29 is determined. While in this state, ultrasonic wave vibration is applied at the same time that force F1 is applied in the arrow G direction, whereby heat is generated from the shape distortion of the abutting portion 69c and an abutting portion S of the sloped face 59d. This heat generation causes the inner side face 59b and the outer side face 69b to melt, and the spaces are reduced between the floor face 59c of the recessed adhering portion 59 and the edge face 69d of the adhesion-receiving protruding portion 69, in the arrow G direction.

Consequently, as illustrated in FIG. 18C, the inner side face 59b and the outer side face 69b melt while the positioning inner side face 59a and the positioned outer side face 69a of the toner container lid 29 and developer frame 24 are abutted against each other. Upon application of the ultrasonic wave vibration stopping, heat generation from the vibrations lessens and the inner side face 59b and the outer side face 69b are welded together, whereby the first adhering portion is formed. Also, by causing the positioning inner side face 59a and the positioned outer side face 69a of the toner container lid 29 and developer frame 24 to abut against each other from the pressing force F5 that is generated by the force F1 in the arrow G direction, as described above, positioning in the transverse direction M is performed during the adhering and after adhering has been completed.

Second Modification of First Adhering Portion

Note that according to the exemplary embodiments described above, the sloped faces 50d and 59d have been described using examples where recessed adhering portions 50 and 59 of the first adhering portions 70 and 79 are provided. However, the sloped faces 50d and 59d may be provided to the adhesion-receiving protruding portion 60 and 69 of the first adhering portions 70 and 79.

Another modification of the first adhering portion will be described with reference to FIGS. 19A through 19C.

Figure 19A:
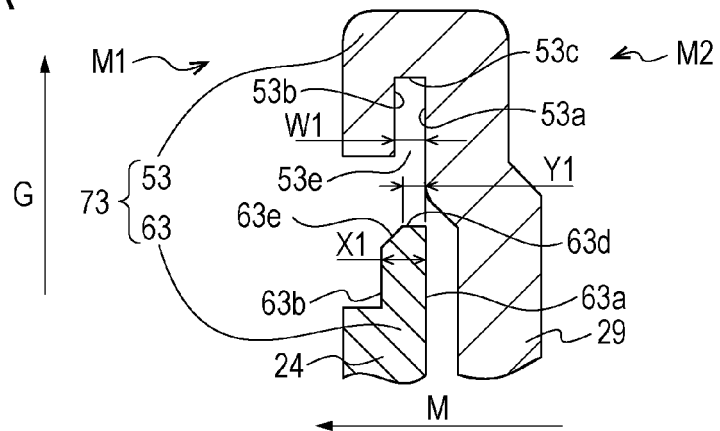
FIGS. 19A through 19C are cross-sectional diagrams to illustrate a modification of the first adhering portion.
Figure 19B:
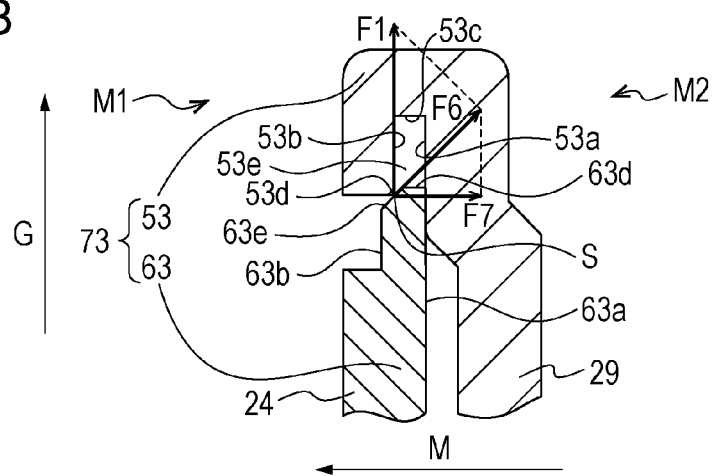
Figure 19C:
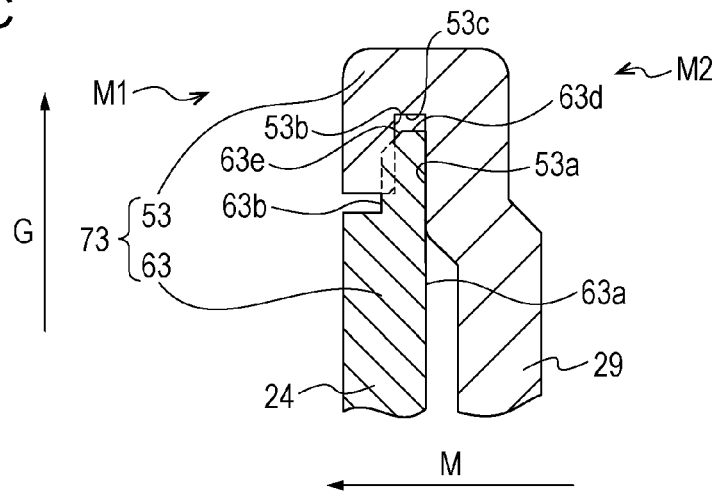

FIGS. 19A through 19C are cross-sectional diagrams to describe a modification of a first adhering portion 73. FIG. 19A is a cross-sectional diagram illustrating a state before a recessed adhering portion 53 and adhesion-receiving protruding portion 63 are abutted against each other. FIG. 19B is a cross-sectional diagram illustrating a state wherein the recessed adhering portion 53 and adhesion-receiving protruding portion 63 have abutted against each other and immediately before the start of adhering. FIG. 19C is a cross-sectional diagram illustrating a state wherein the recessed adhering portion 53 and adhesion-receiving protruding portion 63 have completed adhering and wherein the first adhering portion has been formed.

As illustrated in FIG. 19A, the recessed adhering portion 53 has a recessed cross-section, the recessed adhering portion 53 is made up of a positioning inner side face 53a that performs positioning of the developer frame 24 as to the toner container lid 29, an inner side face 53b, floor face 53c, and opening 53e.

The adhesion-receiving protruding portion 63 has a protruding cross-section, and the adhesion-receiving protruding portion 63 is made up of a positioned outer side face 63a in a case of performing positioning of the developer frame 24 as to the toner container lid 29, an outer side face 63b, edge face 63d, and sloped face 63e.

The positioned outer side face 63a faces the positioning inner side face 53a, the outer side face 63b faces the inner side face 53b, and the edge face 63d faces the floor face 53c. The sloped face 63e is provided in the direction of the protruding edge width Y1 becoming smaller, than the protruding portion width X1. The recessed opening width W1 of the opening 53e is smaller than the protruding portion width X1, and greater than the protruding portion edge width Y1. That is to say, X1>W1>Y1 holds true.

Next, as illustrated in FIG. 19B, the recessed adhering portion 53 and adhesion-receiving protruding portion 63 are pressed together in the arrow G direction, upon which the abutting portion 53d that is provided to the edge of the inner side face 53b and the sloped face 63e are abutted against each other. At this time, force F1 in the arrow G direction at the abutting portion 53d is restricted by the sloped face 63e, whereby force F6 arises which follows the sloped face 63e. Also, pushing force F7, which is a component force that is orthogonal to the arrow G direction of the force F6, arises at the abutting portion 53d. Therefore, the positioned outer side face 63a is pressed by the positioning inner side face 53a, whereby the position in the transverse direction M of the developer frame 24 as to the toner container lid 29 is determined. While in this state, ultrasonic wave vibration is applied at the same time that force F1 is applied in the arrow G direction, whereby heat is generated from the shape distortion of the abutting portion 53d and an abutting portion S of the sloped face 63e. This heat generation causes the inner side face 53b and the outer side face 63b to melt, and the spaces are reduced between the floor face 53c of the recessed adhering portion 53 and the edge face 63d of the adhesion-receiving protruding portion 63, in the arrow G direction.

Consequently, as illustrated in FIG. 19C, the inner side face 53b and the outer side face 63b melt while the positioning inner side face 53a and the positioned outer side face 63a of the toner container lid 29 and developer frame 24 are abutted against each other. Upon application of the ultrasonic wave vibration stopping, heat generation from the vibrations lessens and the inner side face 53b and the outer side face 63b are welded together, whereby the first adhering portion is formed. Also, by causing the positioning inner side face 53a and the positioned outer side face 63a of the toner container lid 29 and developer frame 24 to abut against each other from the pressing force F7 that is generated by the force F1 in the arrow G direction, as described above, positioning in the transverse direction M is performed during the adhering and after adhering has been completed.

Third Modification of First Adhering Portion

According to the present embodiment, descriptions of the recessed adhering portion (50, 53) are primarily given with examples having a positioning inner side face (50a, 53a), inner side face (50b, 53b), floor face (50c, 53c), sloped face (50d, 53d), and opening (50e, 53e). A modification of the present exemplary embodiment will be described as providing an integrated inner side face (50b, 53b) and sloped face (50d, 53d).

Another modification of the first adhering portion will be described with reference to FIGS. 20A through 20C.

Figure 20A:
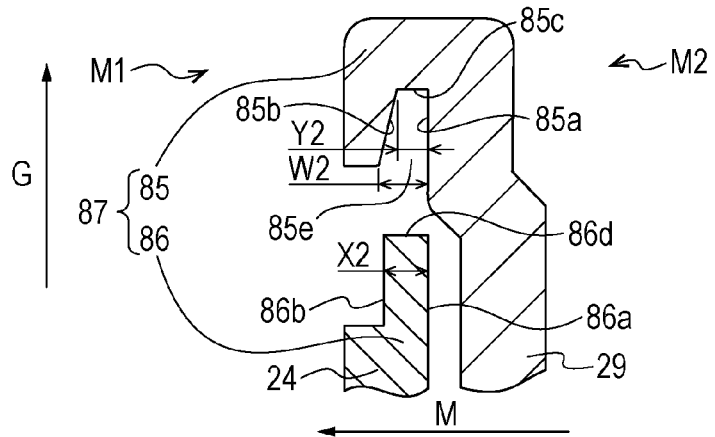
FIGS. 20A through 20C are cross-sectional diagrams to illustrate a modification of the first adhering portion.
Figure 20B:
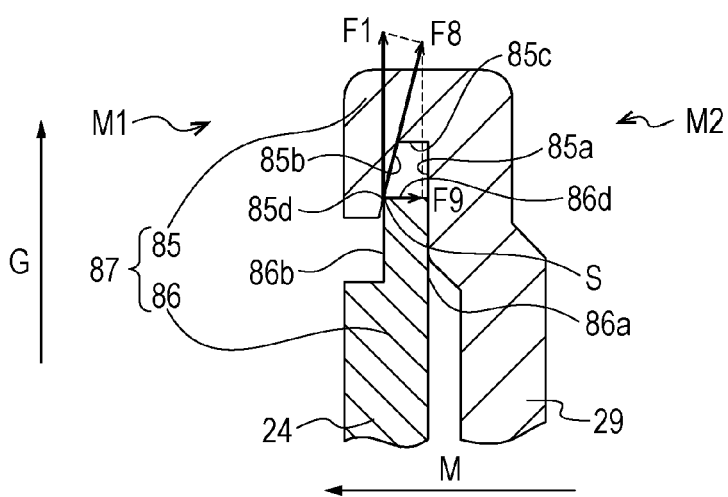
Figure 20C:
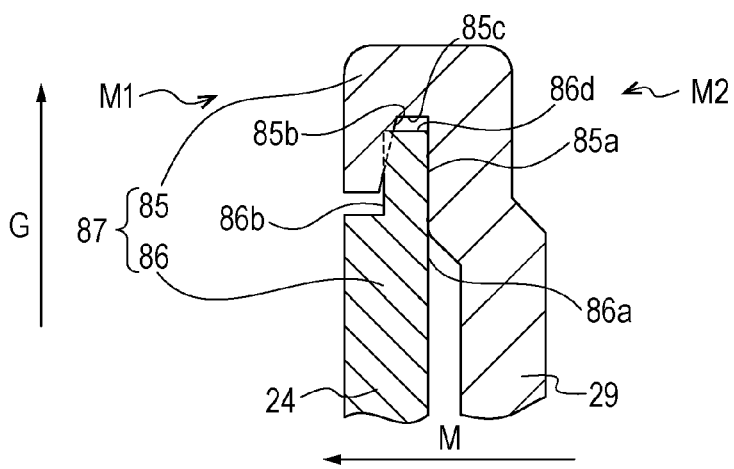

FIGS. 20A through 20C are cross-sectional diagrams to describe a modification of a first adhering portion 87. FIG. 20A is a cross-sectional diagram illustrating a state before a recessed adhering portion 85 and adhesion-receiving protruding portion 86 are abutted against each other. FIG. 20B is a cross-sectional diagram illustrating a state wherein the recessed adhering portion 85 and adhesion-receiving protruding portion 86 have abutted against each other and immediately before the start of adhering. FIG. 20C is a cross-sectional diagram illustrating a state wherein the recessed adhering portion 85 and adhesion-receiving protruding portion 86 have completed adhering.

As illustrated in FIG. 20A, the recessed adhering portion 85 has a recessed cross-section, and the recessed adhering portion 85 is made up of a positioning inner side face 85a that performs positioning of the developer frame 24 as to the toner container lid 29, a sloped face 85b, floor face 85c, and opening 85e. The sloped face 85b is provided in the direction of increasing the recessed opening width W2 of the opening 85e so as to be wider than the recessed floor face width Y2.

Also, the adhesion-receiving protruding portion 86 has a protruding cross section, and the adhesion-receiving protruding portion 86 is made up of a positioned outer side face 86a for a case of performing positioning of the developer frame 24 as to the toner container lid 29, an outer side face 86b, and edge face 86d. The positioned outer side face 86a faces the positioning inner side face 85a, the outer side face 86b faces the inner side face 85b, and the edge face 86d faces the floor face 85c. The protruding edge width X2 is greater than the recessed floor face width Y2, and is smaller than the recessed opening width W2 of the opening 85e. That is to say, W2>X2>Y2 holds true.

As illustrated in FIG. 20B, the recessed adhering portion 85 and adhesion-receiving protruding portion 86 are pressed together in the arrow G direction, upon which the abutting portion 86c that is provided to the edge of the outer side face 86b and the sloped face 85b are abutted against each other. At this time, force F1 in the arrow G direction at the abutting portion 86c is restricted by the sloped face 85b, whereby force F8 arises which follows the sloped face 85b. Also, pushing force F9, which is a component force that is orthogonal to the arrow G direction of the force F8, arises at the abutting portion 86c. Therefore, the positioned outer side face 86a is pressed by the positioning inner side face 85a, whereby the position in the transverse direction M of the developer frame 24 as to the toner container lid 29 is determined. While in this state, ultrasonic wave vibration is applied at the same time that force F1 is applied in the arrow G direction, whereby heat is generated from the shape distortion of the abutting portion 86c and an abutting portion S of the sloped face 85b. This heat generation causes the inner side face 85b and the outer side face 86b to melt, and the spaces are reduced between the floor face 85c of the recessed adhering portion 85 and the edge face 85d of the adhesion-receiving protruding portion 86, in the arrow G direction.

Consequently, as illustrated in FIG. 20C, the sloped face 85b and the outer side face 86b melt while the positioning inner side face 85a and the positioned outer side face 86a of the toner container lid 29 and developer frame 24 are abutted against each other. Upon application of the ultrasonic wave vibration stopping, heat generation from the vibrations lessens and the sloped face 85b and the outer side face 86b are welded together. Also, by causing the positioning inner side face 85a and the positioned outer side face 86a of the toner container lid 29 and developer frame 24 to abut against each other from the pressing force F3 that is generated by the force F1 in the arrow G direction, as described above, positioning in the transverse direction M is performed during the adhering and after adhering has been completed.

Method to Attach and Detach Process Cartridge to and from Apparatus Main Body

Next, a method of attaching and detaching the process cartridge 5 to and from the apparatus main body 1a will be described with reference to FIGS. 21A, 21B, 22A, and 22B.

Figure 21A:
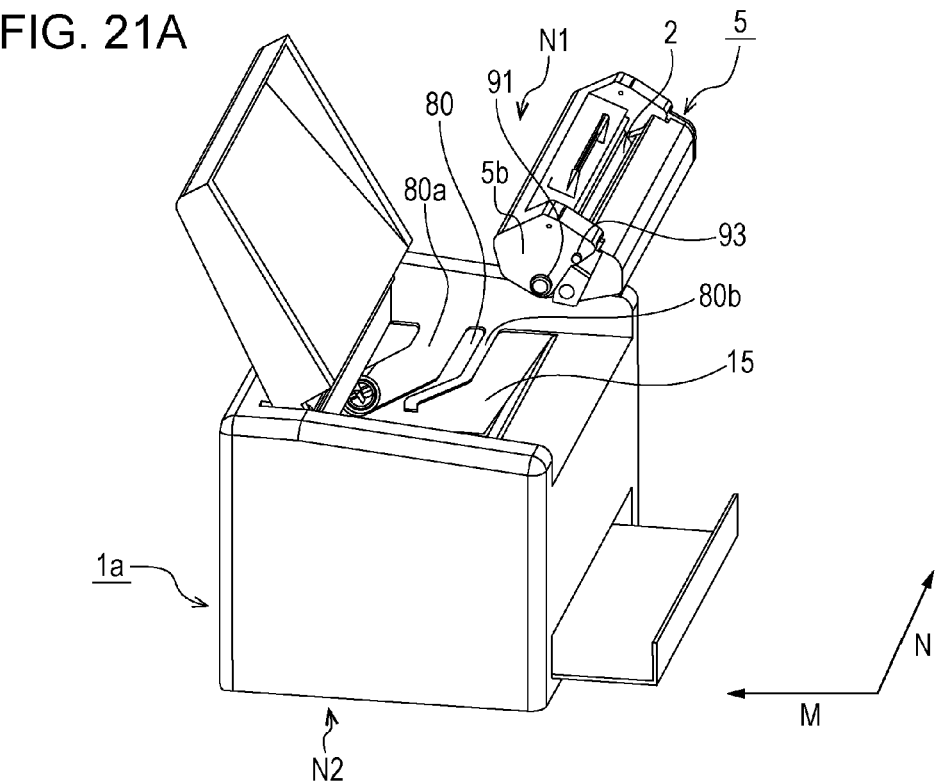
FIGS. 21A and 21B are perspective views to illustrate a method to attach and detach the process cartridge as to the apparatus main body.
Figure 21B:
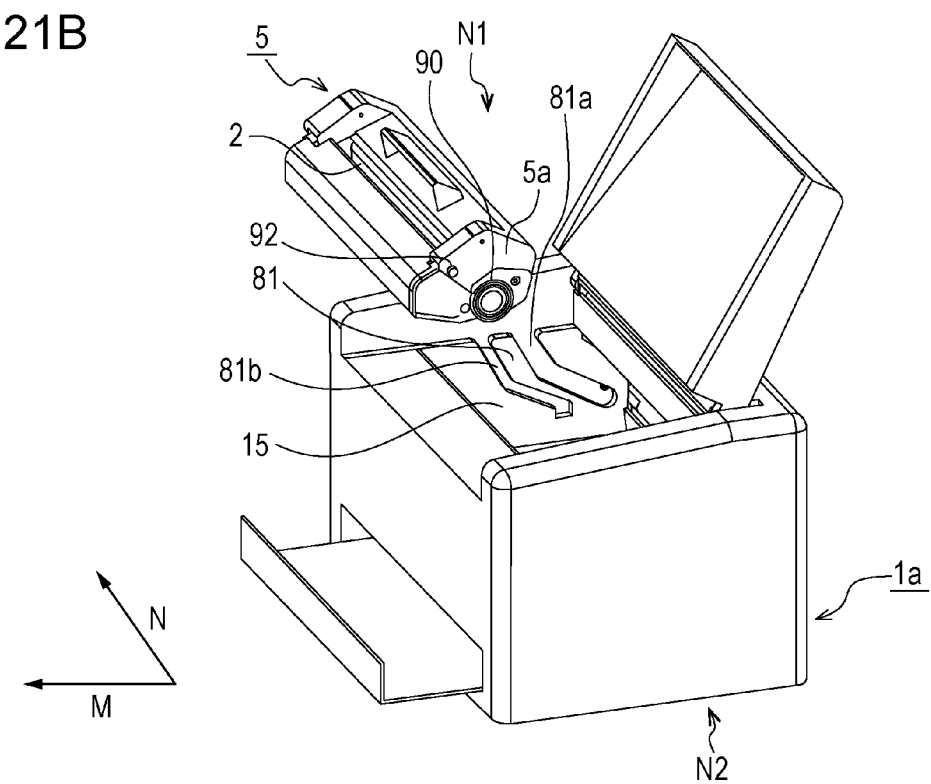

FIGS. 21A and 21B are perspective views to illustrate a method to attach and detach the process cartridge 5 as to the apparatus main body 1a. FIG. 21A is a perspective view as seen from the other end side N2 in the lengthwise direction N. FIG. 21B is a perspective view as seen from one end side N1 in the lengthwise direction N.

Figure 22A:
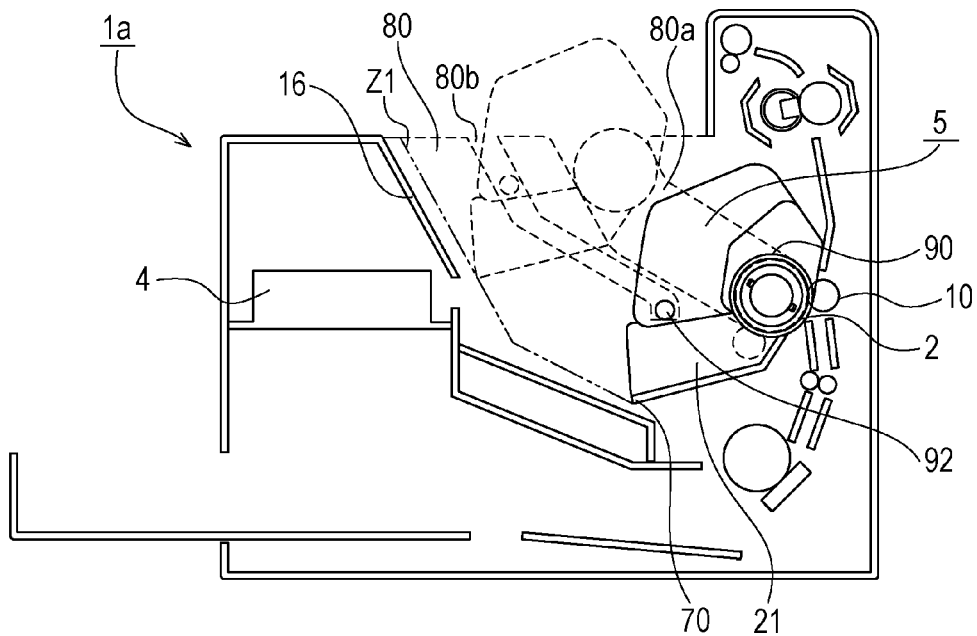
FIGS. 22A and 22B are explanatory views to illustrate an attaching and detaching path of the process cartridge as to the apparatus main body.
Figure 22B:
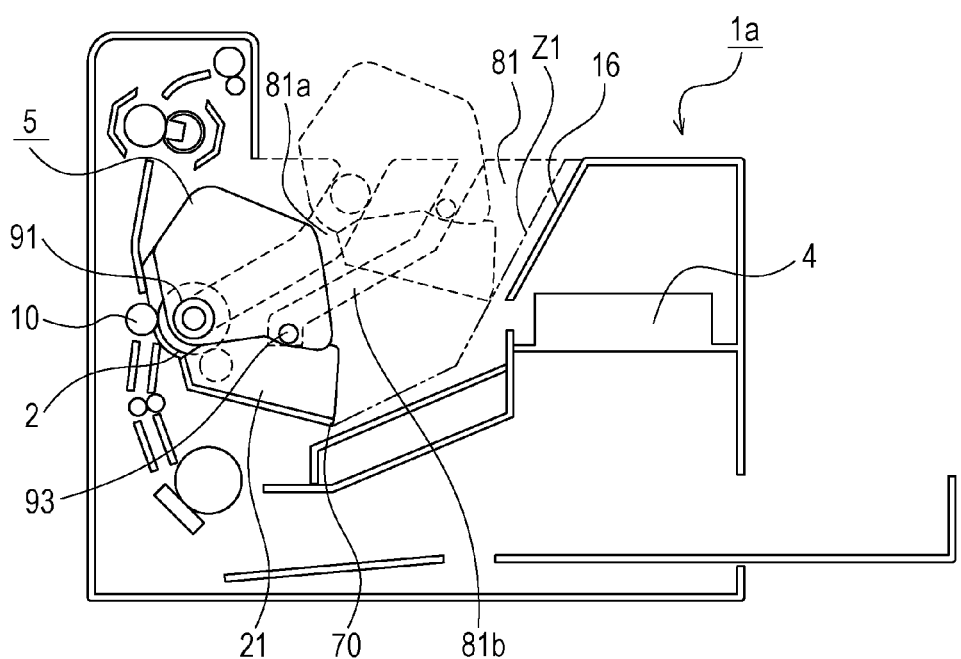

FIGS. 22A and 22B are descriptive diagrams to illustrate an attaching and detaching path of the process cartridge 5 to and from the apparatus main body 1a. FIG. 22A is a descriptive diagram as seen from one end side N1 in the lengthwise direction N. FIG. 22B is a descriptive diagram as seen from the other end side N2 in the lengthwise direction N.

As illustrated in FIGS. 21A and 21B, a positioning boss 90 and a positioning boss 91 to perform position restrictions within the apparatus main body 1a of the process cartridge 5 are provided on the side faces in the lengthwise direction N of the photosensitive drum 2 of the process cartridge 5. Also, a rotation stopping boss 92 that performs rotation restrictions of the process cartridge 5 is provided to the side face 5a on the one end side N1 in the lengthwise direction N of the process cartridge 5. Also, a guided boss 93 to stabilize the attaching and detaching stance of the process cartridge 5 is provided to the side face 5b of the other end side N2 in the lengthwise direction N of the process cartridge 5.

An opening 15 to attach and detach the process cartridge 5 is in the apparatus main body 1a, and an exposure device 4 is disposed below the opening (FIGS. 22A and 22B). Also, guide rail members 80 and 81 are provided as installation devices to guide the process cartridge 5 to the installation completion position in the apparatus main body 1a after the process cartridge 5 has passed through the opening 15 in a case of installing the process cartridge 5. A positioning guide portion 80a that guides the positioning boss 90 on the processing cartridge 5 is provided to the guide rail member 80 which is provided on the one end side N1 in the lengthwise direction N of the apparatus main body 1. Also, a rotation stopping guide portion 80b that guides the rotation stopping boss 92 on the processing cartridge 5 is provided. Also, a positioning guide portion 81a that guides the positioning boss 91 on the process cartridge 5 is provided to the guide rail member 81 that is provided on the other end side N2 in the lengthwise direction N of the apparatus main body 1a. Also, an attaching and detaching guide portion 81b that guides the guided boss 93 on the process cartridge 5 is provided.

As illustrated in FIGS. 22A and 22B, the process cartridge 5 is in a state wherein the positioning bosses 90 and 91 and the positioning guide rail portions 80a and 81a, the rotation stopping boss 92 and rotation stopping guide rail portion 80b, the guided boss 93 and the attaching and detaching guide portion 81b are fit together. In this state, the process cartridge 5 is attached to and detached from the apparatus main body 1a following the guide rails 80 and 81. At this time, the process cartridge 5 is attached and detached along a protecting member 16 which is provided above the exposure device 4 and which protects the exposure device 4, the photosensitive drum 2 is abutted against the transfer roller 10 and is positioned.

Relation of Process Cartridge and Apparatus Main Body

The path followed in a case of attaching or detaching the process cartridge 5 to or from the apparatus main body 1a is indicated by a dashed-two dotted line Z1 in FIGS. 22A and 22B. Thus, the process cartridge 5 passes above the exposure device 4 to be attached or detached. Accordingly, in the process of attaching or detaching the process cartridge 5 to or from the apparatus main body 1a, the first adhering portion 70 of the process cartridge 5 comes the closest to the protecting member 16. Now, the second adhesion-receiving portion 24b (FIGS. 9 and 10) that is away from the adhering portion is supported by and adhered to the adhering portion that is closest to the protecting member 16. Flanges such as the first adhesion-receiving portion 24a, the third adhesion-receiving portion 24c, and the fourth adhesion-receiving portion 24d (FIGS. 9 and 10) are unnecessary, so the first adhering portion 70 wherein the size of the adhering portion can be reduced, is used. Accordingly, the space needed to attach and detach the process cartridge 5 can be smaller. In other words, by using the processing cartridge 5 which includes a developer container that has the first adhering portion 70 according to the present exemplary embodiment, the portion correlating to the distance of the Z1 portion from the protecting member can be removed from the apparatus main body, since the flange portion not included. Therefore, the size of the apparatus main body can be reduced. It goes without saying that the flange portions can be omitted as in the description above, but depending on the use thereof, the flange portion can be used with a smaller width.

Next, a specific configuration of the apparatus main body 1a in the case of applying the present embodiment will be described with reference to FIG. 23.

Figure 23A:
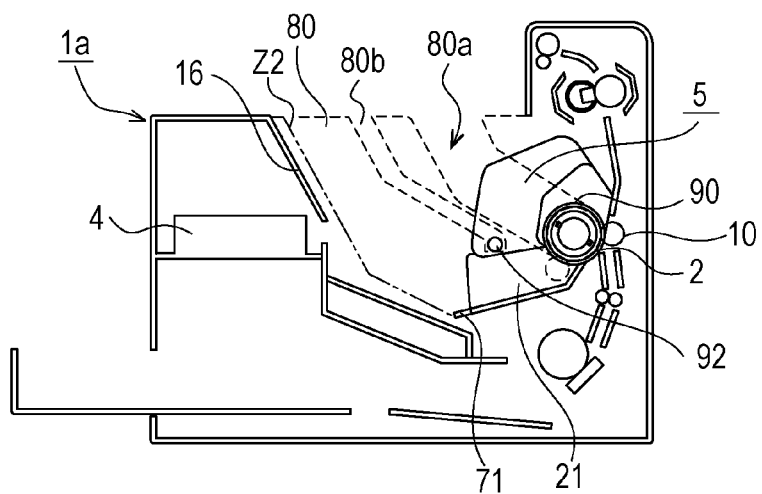
FIGS. 23A through 23C are cross-sectional diagrams of the apparatus main body.
Figure 23B:
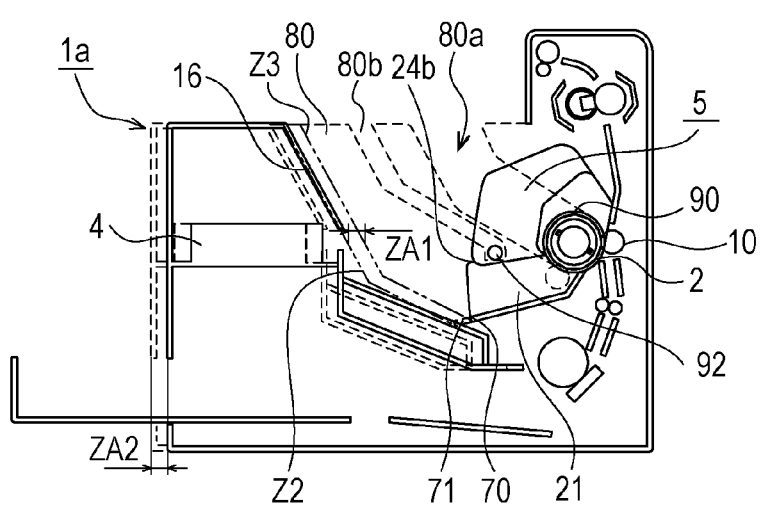
Figure 23C:
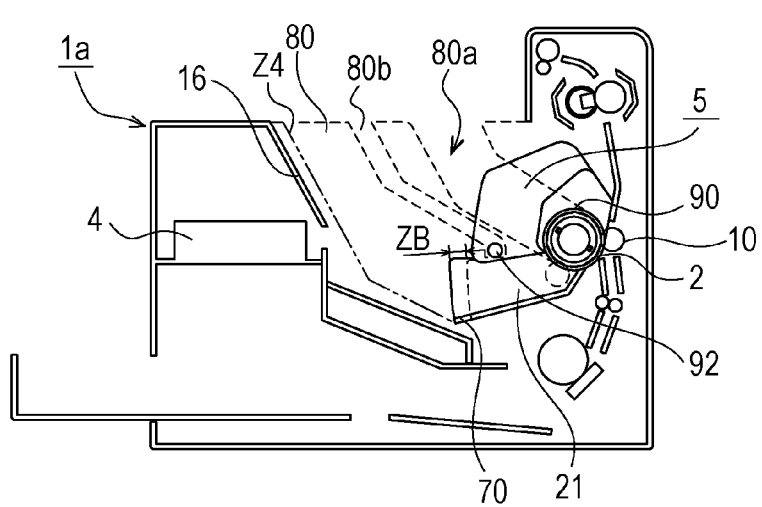

FIGS. 23A through 23C are cross-sectional diagrams to describe advantages in the case of applying the present embodiment. FIG. 23A is a cross-sectional diagram to describe the related art. FIG. 23B is a cross-sectional diagram to describe a state wherein the size of the apparatus main body 1a is reduced. FIG. 23C is a cross-sectional diagram to describe a state wherein the developer container 21 is increased in size.

As illustrated in FIG. 23A, a second adhering portion 71 which provides a flange, which is a receiving portion at the time of adhering, near the adhering portion, to the portion wherein the adhering portion of the process cartridge 5 is closest to the protecting member 16. The path that the second adhering portion 71 follows in a case of attaching or detaching the process cartridge 5 to or from the apparatus main body 1a is indicated by a dashed-two dotted line Z2 in FIG. 23A.

Conversely, in FIG. 23B, the first adhering portion 70 is used at the part where the adhering portion of the process cartridge 5 is closest to the protecting member 16. Thus, the flange on the second adhesion-receiving portion 24b (FIGS. 9 and 10) is unnecessary, and the processing cartridge 5 can be distanced from the protecting member 16 when attaching or detaching to or from the apparatus main body 1a. The path that the second adhering portion 71 follows in a case of attaching or detaching the process cartridge 5 to or from the apparatus main body 1a is indicated by a dashed-two dotted line Z3 in FIG. 23B. Thus, the width ZA1 of the space to attach or remove the process cartridge 5 can be reduced. Accordingly, the width ZA2 of the apparatus main body 1a can be reduced, and installation space reduction of the apparatus main body 1 can be achieved.

Also, as illustrated in FIG. 23C, the first adhering portion 70 which enables the size of the adhering portion to be reduced, is used at the part where the adhering portion of the process cartridge 5 is closest to the protecting member 16. The path that the second adhering portion 71 follows in a case of attaching or detaching the process cartridge 5 to or from the apparatus main body 1a is indicated by a dashed-two dotted line Z4 in FIG. 23C. In the case that the size of the apparatus main body 1a is the same as in FIG. 23A, the width ZB of the developer container 21 can be increased. Therefore, the amount of contained toner can be increased. Accordingly, the number of printed sheets by the process cartridge 5 can be increased without increasing the size of the apparatus main body 1a.

The first adhering portion 70 is described above in an example of being provided to all of the one end side M1 in the transverse direction M, but the same advantages can be obtained also in the case of provided the first adhering portion 70 to a portion of the one end side M1 in the transverse direction. In the case of providing the first adhering portion to one portion, a configuration may be used wherein the center portion performs adhering or sealing with a protruding adhering portion or sealing member, and the end portions are the first adhering portion. This is because in this case, the position relation in the lengthwise direction M can be adjustable to a certain extent in order to weld both ends.

Advantages described in the example of application to the developer unit 21 of the developing unit 20 can also be obtained in the case of application to a waste toner accommodation section 32a of the photosensitive unit 30.

Second Embodiment

Next, a second embodiment will be described with reference to FIGS. 24 and 25.

Note that configurations of the present embodiment that differ from the above-described embodiment will be described in detail.

Figure 24:
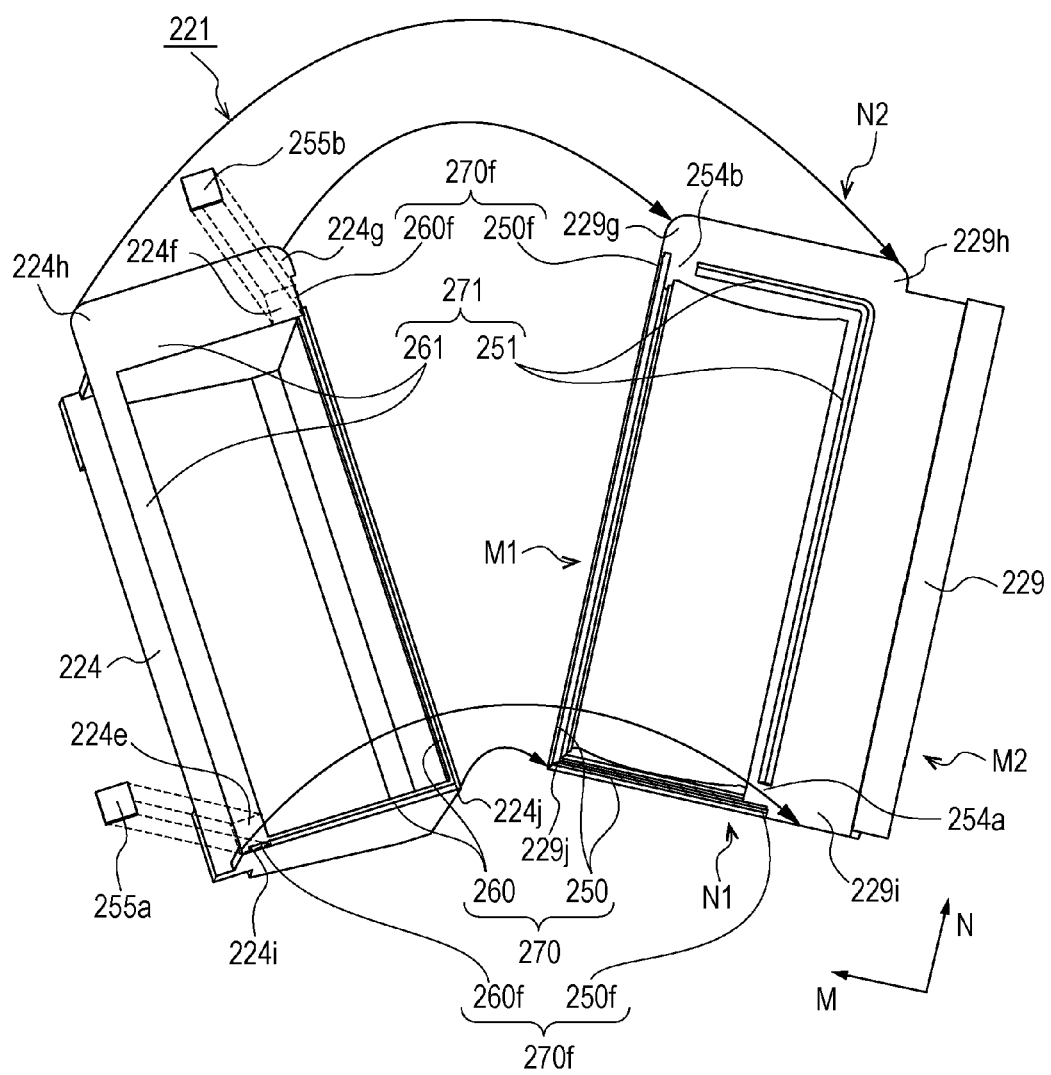
FIG. 24 is a perspective view to illustrate a joining configuration of the toner container lid and developer frame.

FIG. 24 is a perspective view to describe a joining configuration of the toner container lid 229 and developer frame 224 according to the present embodiment. The developer container 221 is configured by matching the corners 229g, 229h, 229i, and 229j of the toner container lid 229 with the corners 224g, 224h, 224i, and 224j of the developer frame 224.

Figure 25:
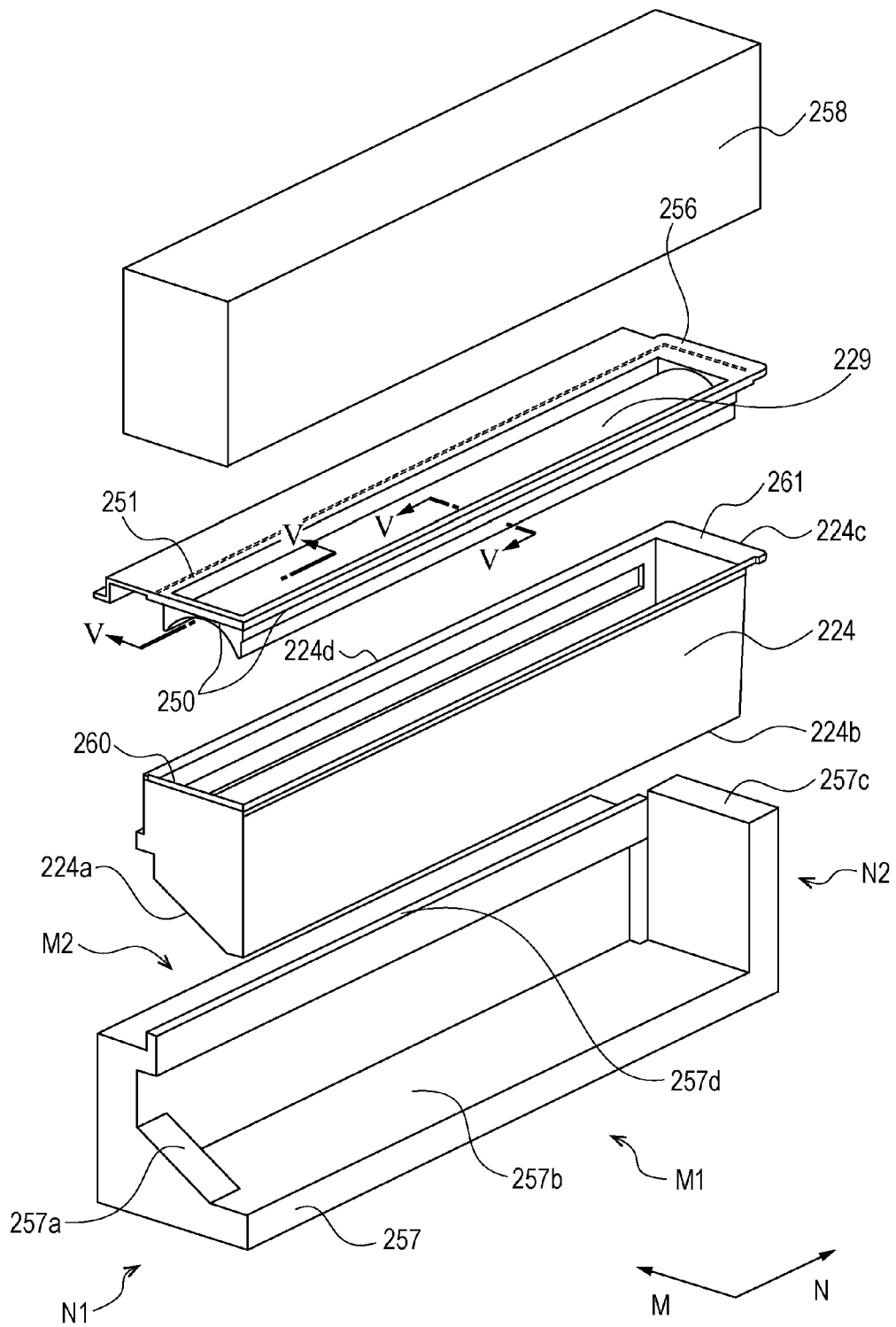
FIG. 25 is a perspective view to illustrate a method to adhere the toner container lid and developer frame.

FIG. 25 is a perspective view to describe a joining configuration of the toner container lid 229 and developer frame 224. The V-V cross-sections in FIG. 25 have the same cross-sectional shape.

As illustrated in FIG. 24, a configuration of the adhering portion of the developer container 221 according to the present embodiment is provided with a recessed adhering portion 250 on the one end side M1 in the transverse direction M, and on the one end side N1 in the lengthwise direction N, of the toner container lid 229. Also, a recessed end adhering portion 250f is provided to the other end side M2 in the transverse direction M, and the other end side N2 in the lengthwise direction N, of the recessed adhering portion 250. Also, a protruding adhering portion 251 is provided to the other end side M2 in the transverse direction M and to the other side N2 in the lengthwise direction N.

An adhesion-receiving protruding portion 260 is provided to the developer frame 224 at a position that faces the recessed adhering portion 250, an adhesion-receiving protruding end portion 260f is provided at a position that faces the recessed end adhering portion 250f, and a flat adhering portion 261 is provided at a position that faces the protruding adhering portion 251.

The recessed adhering portions 250 provided to the one end side M1 in the transverse direction M and on the one end side N1 in the lengthwise direction N are disposed in directions that are orthogonal to each other.

The first end adhering portion 270f that is formed with the recessed end adhering portion 250 and adhesion-receiving protruding end portion 260f, and the second adhering portion 271 that is formed with the protruding adhering portion 251 and flat adhering portion 261, are not connected, and spaces 254a and 254b are provided therebetween. Sealing members 255a and 255b that fill in the spaces 254a and 254b between the first end adhering portion 270f and second adhering portion 271, and that inhibit the toner from leaking out of the developer container 221, are provided. The sealing members are attached by an adhesive, such as two-sided adhesive tape or the like, to sealing member attaching portions 224e and 224f of the developer frame 224.

Also, the cross-sectional shapes of the first adhering portion 270 which is formed with the recessed adhering portion 250 and adhesion-receiving protruding portion 260, and of the first end adhering portion 270f which is formed with the recessed end adhering portion 250f and adhesion-receiving protruding end portion 260f, are similar to the first embodiment. Also, the cross-sectional shape of the second adhering portion 271 which is formed with the protruding adhering portion 251 and flat adhering portion 261 is similar to the first embodiment.

Next, a method to adhere the toner container lid 29 and developer frame 24 will be described with reference to FIG. 25.

As illustrated in FIG. 25, an adhering horn contact surface 256 is provided to the recessed adhering portion 250 of the toner container lid 29 and the back surface of the protruding adhering portion 251 (indicated by a dotted line in FIG. 25). Also, a first adhesion-receiving portion 224a, which is a received face at the time of adhesion, and a second adhesion-receiving portion 224b, which is a second received face at the time of adhesion, are provided to the developer frame 224. Also, a third adhesion-receiving portion 224c, which is a third received face at the time of adhesion, and a fourth adhesion-receiving portion 224d, which is a fourth received face at the time of adhesion, are provided.

At the time of adhesion, the first adhesion-receiving portion 224a is supported by the first adhesion receiving portion 257a of an adhesion cradle 257, the second adhesion-receiving portion 224b is supported by the second adhesion receiving portion 257b. Also, the third adhesion-receiving portion 224c is supported by the third adhesion receiving portion 257c, and the fourth adhesion-receiving portion 224d is supported by the fourth adhesion receiving portion 257d.

Next, regarding a method to position the toner container lid 229 and developer frame 224, the V-V cross-sections in FIG. 25 have the same cross-sectional shape, as described above, and the shape thereof is the same configuration as described in FIG. 5. Therefore, the description thereof will be omitted here.

According to the configurations described in FIGS. 24 and 25, positioning in the lengthwise direction N and transverse direction M of the toner container lid 229 and developer frame 224 can be performed with the first adhering portion 270 with an abutting portion having no fitting gaps. Therefore, a flange, which is space to allow for the fitting gap, does not have to be provided, whereby the size of the adhering portion can be reduced.

Also, since there is no deviation between frames resulting from fitting gaps in the transverse direction M of the toner container lid 229 and developer frame 224, accuracy of dimension of appearance of the developer container 221 is improved.

According to the first embodiment, a boss portion 52 and hole 62 had to be provided farther toward the outer side than the second adhering portion 71 of the one end side N1 in the lengthwise direction N. Conversely, according to the configuration of the present embodiment, the boss portion and hole for positioning do not have to be provided farther toward the outer side than the second adhering portion 271 of the one end side N1 in the lengthwise direction N. Therefore, the size of the developer container 221 can be further reduced.

Note that the first adhering portion 270 according to the present embodiment is described as a configuration of being provided to all of the one end side M1 in the transverse direction M and the other end side N2 in the lengthwise direction N. However, in order to achieve the advantages desired in the present embodiment, the first adhering portion 270 may be in a configuration of being provided to a portion of the one end side M1 in the transverse direction M and another end side N2 in the lengthwise direction N.

Third Embodiment

A third embodiment will be described with reference to FIG. 26.

Note that configurations of the present embodiment that differ from the above-described embodiment will be described in detail. FIG. 26 is a perspective view to describe a joining configuration of the toner container lid 29 and developer frame 24 according to the present embodiment. FIG. 26 illustrates a state before the toner container lid 29 and the developer frame 24 joining. While in a state that the corners 29g, 29h, 29i, and 29j of the toner container lid 29 match the positions facing the corners 24g, 24h, 24i, and 24j, respectively, of the developer frame 24, both frames are joined together by later-described ultrasonic wave welding, whereby the developer container 21 is assembled.

Figure 26:
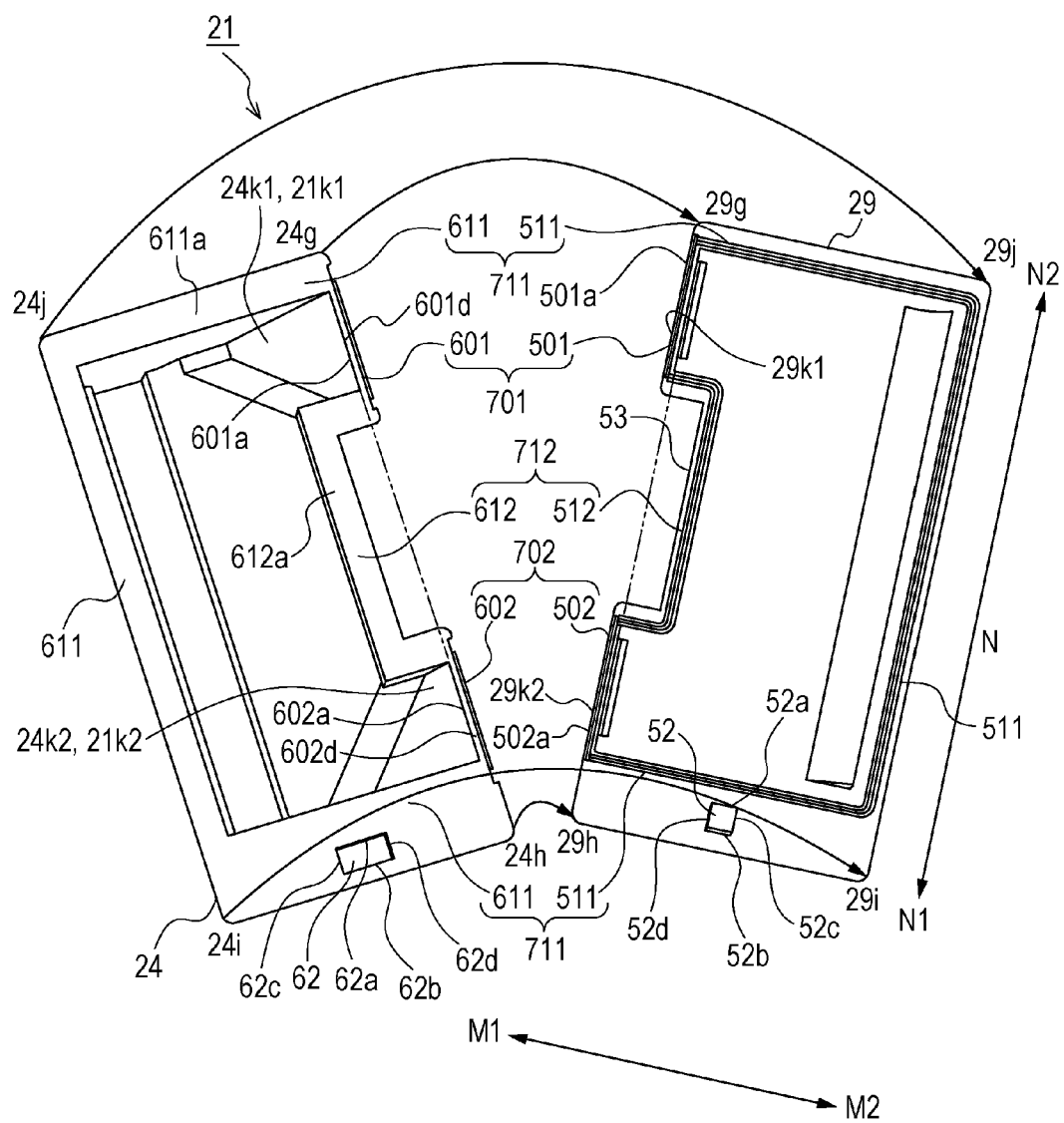
FIG. 26 is a perspective view to illustrate a joining configuration of the toner container lid and developer frame.

As illustrated in FIG. 26, recessed adhering portions 501 and 502 are provided to the toner container lid 29 on the one end side M1 side in the transverse direction M, so as to form a first protruding toner storage section 21k1 and second protruding toner storage section 21k2. The first protruding toner storage section 21k1 and second protruding toner storage section 21k2 are configured so that a laser beam from an exposure device can pass through. Further, the recessed adhering portions 501 and 502 have positioning inner side faces 501a and 502a, respectively, which perform positioning of the developer frame 24.

According to the present embodiment, the cross-sectional shapes of the recessed adhering portions 501 and 502 are formed so as to have the same shape. Further, the positioning inner side faces 501a and 502a are disposed on the same straight line.

Also, a protruding adhering portion 512 is provided to connect the first protruding toner storage section 21k1 and second protruding toner storage section 21k2, at a U-shaped portion which is for forming a laser beaming space. A protruding adhering portion 511 is provided to the other end M2 side in the transverse direction M and on both end sides in the lengthwise direction N.

Also, a boss portion 52 that performs positioning in the lengthwise direction N of the toner container lid 29 and developer frame 24 is provided on the outer side in the lengthwise direction N of the protruding adhering portion 511 on the one end side N1 in the lengthwise direction N.

In a case of integrating the developer frame 24 and toner container lid 29 by adhering, adhesion-receiving protruding portion 601 and 602 are provided to the developer frame 24 in positions facing the recessed adhering portions 501 and 502 of the toner container lid 29. Further, the adhesion-receiving protruding portion 601 and 602 have positioned outer side faces 601a and 602a that are positioned by positioning inner side faces 501a and 502a.

According to the present embodiment, the cross-sectional shapes of the adhesion-receiving protruding portion 601 and 602 are formed so as to have the same shape. Further, positioned outer side faces 601a and 602a are disposed on the same straight line.

The developer frame 24 and toner container lid 29 are positioned in the transverse direction N at two locations of first adhering portions 701 and 702. According to the present embodiment, the first adhering portions 701 and 702 are disposed on the same straight line, in the direction that is orthogonal to the joining direction of the developer frame 24 and toner container lid 29. Thus, there are no deformities that occur to the developer frame 24 and toner container lid 29 in the case that there is a difference in dimensions between the positioning portions in a configuration having multiple positioning portions.

Also, in a case of integrating the developer frame 24 and toner container lid 29 by adhering, flat adhering portions 611 and 612 serving as second adhesion joining portions are provided to the developer frame 24 which is in a position that faces the protruding adhering portions 511 and 512 of the toner container lid 29. Further, the flat adhering portions 611 and 612 have flat portions 611a and 612a.

Further, an edge face (601d, 602d) is provided to the adhesion-receiving protruding portion 601 and 602. According to the present embodiment, the edge faces 601d and 602d and flat portions 611 and 612 are disposed on the same plane.

Also, a first adhering portion 701 that is formed by joining the recessed adhering portions 501 and 502, and a first adhering portion 702 that is formed by joining the adhesion-receiving protruding portion 601 and 602, are respectively formed. Also, the second adhering portions 711 and 712 as joining portions are respectively formed by the protruding adhering portions 511 and 512, and flat adhering portions 611 and 612.

Also, a rectangular-shaped hole 62 that fits together with the boss portion 52 and performs positioning in the lengthwise direction N of the toner container lid 29 and developer frame 24 is provided. By fitting together the lengthwise direction faces 52a and 52b of the boss portion 52 and the lengthwise direction faces 62a and 62b of the hole 62, positioning in the lengthwise direction N of the toner container lid 29 and developer frame 24 is determined. At this time, gaps are provided between the transverse direction faces 52c and 52d of the boss portion 52 and the transverse direction faces 62c and 62d of the hole 62, so as to not restricting the positions in the transverse direction M of the toner container lid 29 and developer frame 24.

Figure 27:
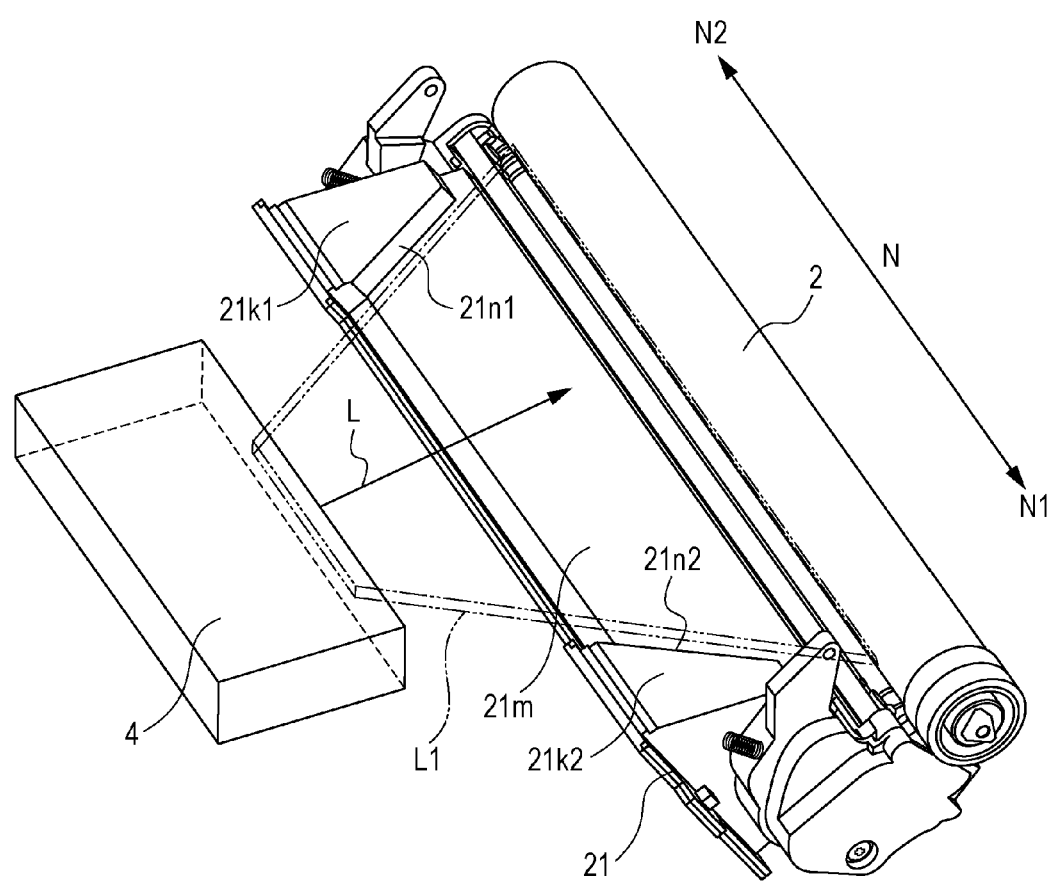
FIG. 27 is a perspective view illustrating the relation between the developer container, photosensitive drum, and the laser beam that is emitted from an exposure device.

As illustrated in FIGS. 27 and 3B, there are configurations that have an adhering portion of the developer container within a region between the photosensitive device 2 and the exposure device 4. In this configuration, a first developer accommodation section and second developer accommodation section are configured outside a region of irradiation space L1. By using the first adhering portions 701 and 702 for the adhering portions as a first side and second side of the developer storage portion, the toner storage portion can be increased and the gaps from the photosensitive unit 30 can be decreased. Thus, dead space can be effectively used.

In the related art, even in a configuration where the first protruding toner storage section 21k1 and second protruding toner storage section 21k2 are provided, the volume had to be reduced by an amount equivalent to the flange portion. However, by using the present embodiment, the volume of the developer container 21 can sufficiently secure more volume than in the related art, so the size of the developer container 21 can be reduced. Further, the developer unit 20, as well as the process cartridge 5 which includes the developer unit 20, and the apparatus main body 1a to which the process cartridge 5 is attachable and detachable, can be reduced in size. Accordingly, reduction in size also reduces the weight and manufacturing costs.

Also, the first adhering portions 701 and 702 which are positioning portions in the transverse direction M are formed in the same shape, and are disposed on the same straight line. That is to say, while the first adhering portions 701 and 702 are positioned at several locations at the transverse directions M, the positioning portions are all disposed on the same straight line. Accordingly, there is no difference in the dimensions of the positioning portions, so the frames are not deformed to absorb difference in dimensions.

Further, the second adhering portion 711 is configured from a protrusion 511a and flat portion 611a, and does not have a positioning function in the transverse direction M. Accordingly, positioning of the toner container lid 29 in the transverse direction M of the developer frame 24 is made with just the positioning function of the first adhering portions 701 and 702.

Therefore, even in the case that there is difference in the dimensions between the first adhering portions 701 and 702 and the second adhering portions 711 and 712 of the toner container lid 29 and developer frame 24, deviation in difference in the dimensions can be absorbed by the second adhering portion. Therefore, adhering can be performed without deforming both frames of the toner container lid 29 and developer frame 24.

Further, the toner container lid 29 is specialized as a function of a lid to cover the opening of the developer frame 24. Also, the toner container lid 29 has been disposed so that the distance from the attaching portions of the developer blade 23, developing roller 22, and spill-inhibiting sheet 25 of the developer frame 24 to the joining portion to the toner container lid 29 is long. Therefore, the relative positional relation of the developer blade 23, developing roller 22, and spill-inhibiting sheet 25 are not influenced by the adhesion, and image quality is improved.

The description above is an example of providing the first adhering portions 701 and 702 to the entire side of the two sides of the other end side M1 which is positioned farthest from the one end side M2 in the transverse direction M, but the same advantages can be obtained even in a case of providing just to one portion thereof.

Also, an example applied to the developer container 21 of the developer unit 20 is described above, but the same advantages can be obtained even in a case of having the container and lid as separate units of the cleaning container 32 of the photosensitive unit 30 and applied to the adhering portions of the container and lid.

Fourth Embodiment

Next, a fourth embodiment will be described with reference to FIG. 28.

Note that configurations of the present embodiment that differ from the above-described embodiment will be described in detail.

Figure 28:
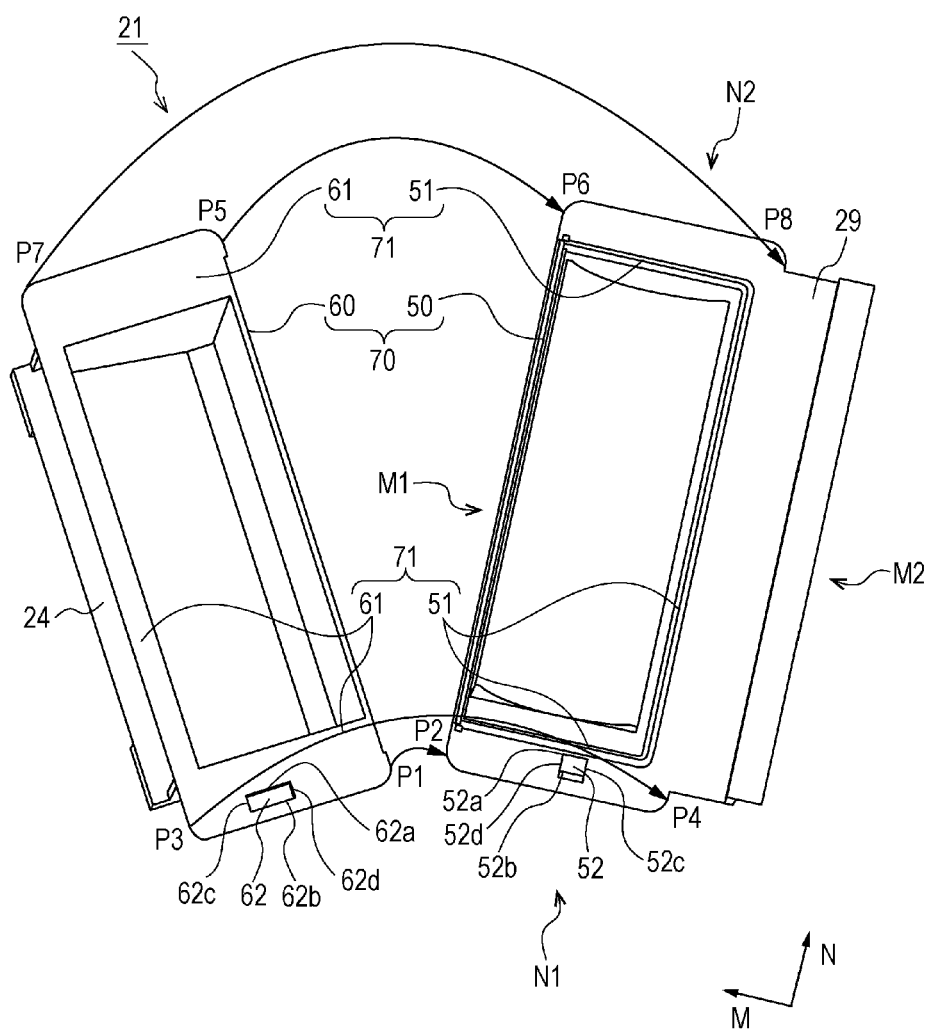
FIG. 28 is a perspective view to illustrate a joining configuration of a toner container lid and a developer frame.

FIG. 28 is a perspective view to describe a joining configuration of the toner container lid 29 and developer frame 24 according to the present embodiment.

As illustrated in FIG. 28, a recessed adhering portion 50 is provided to the one end side M1 in the transverse direction M of the toner container lid 29. The recessed end adhering portion 50f is provided to both end sides in the lengthwise direction N of the recessed adhering portion 50. Also, a protruding adhering portion 51 is provided continuously on the other end side M2 in the transverse direction M and on both end sides in the lengthwise direction N. Also, a boss portion 52 that performs positioning in the lengthwise direction N of the toner container lid 29 and developer frame 24 is provided to the outer side in the lengthwise direction N of the protruding adhering portion 51 on one end side N1 in the lengthwise direction N.

The adhesion-receiving protruding portion 60 is provided to a position on the developer frame 24 that faces the recessed adhering portion 50. Also, the adhesion-receiving protruding end portion 60f is provided to a position that faces the recessed end adhering portion 50f. Also, the flat adhering portion 61 is provided to a position that faces the protruding adhering portion 51. Also, the rectangular hole 62 that performs positioning in the lengthwise direction N of the toner container lid 29 and developer frame 24 is provided so as to be fitted with the boss portion 52. The lengthwise direction faces 52a and 52b of the boss portion 52 and the lengthwise direction faces 62a and 62b of the hole 62 are fitted together, whereby the position in the lengthwise direction N of the toner container lid 29 and developer frame 24 is determined. At this time, gaps are provided between the transverse direction faces 52c and 52d of the boss portion 52 and the transverse direction faces 62c and 62d of the hole 62, so that the positions in the transverse direction M of the toner container lid 29 and developer frame 24 are not restricted.

At this time, the first adhering portion 70 is formed from the recessed adhering portion 50 and the adhesion-receiving protruding portion 60. The first end adhering portion 70f is formed from the recessed end adhering portion 50f and the adhesion-receiving protruding end portion 60f. The second adhering portion 71 is formed from the protruding adhering portion 51 and the flat adhering portion 61.

Connecting Portion of First and Second Adhering Portions

A configuration of a connecting portion between the first adhering portion 70 and second adhering portion 71 will be described with reference to FIGS. 29 and 30.

Figure 29:
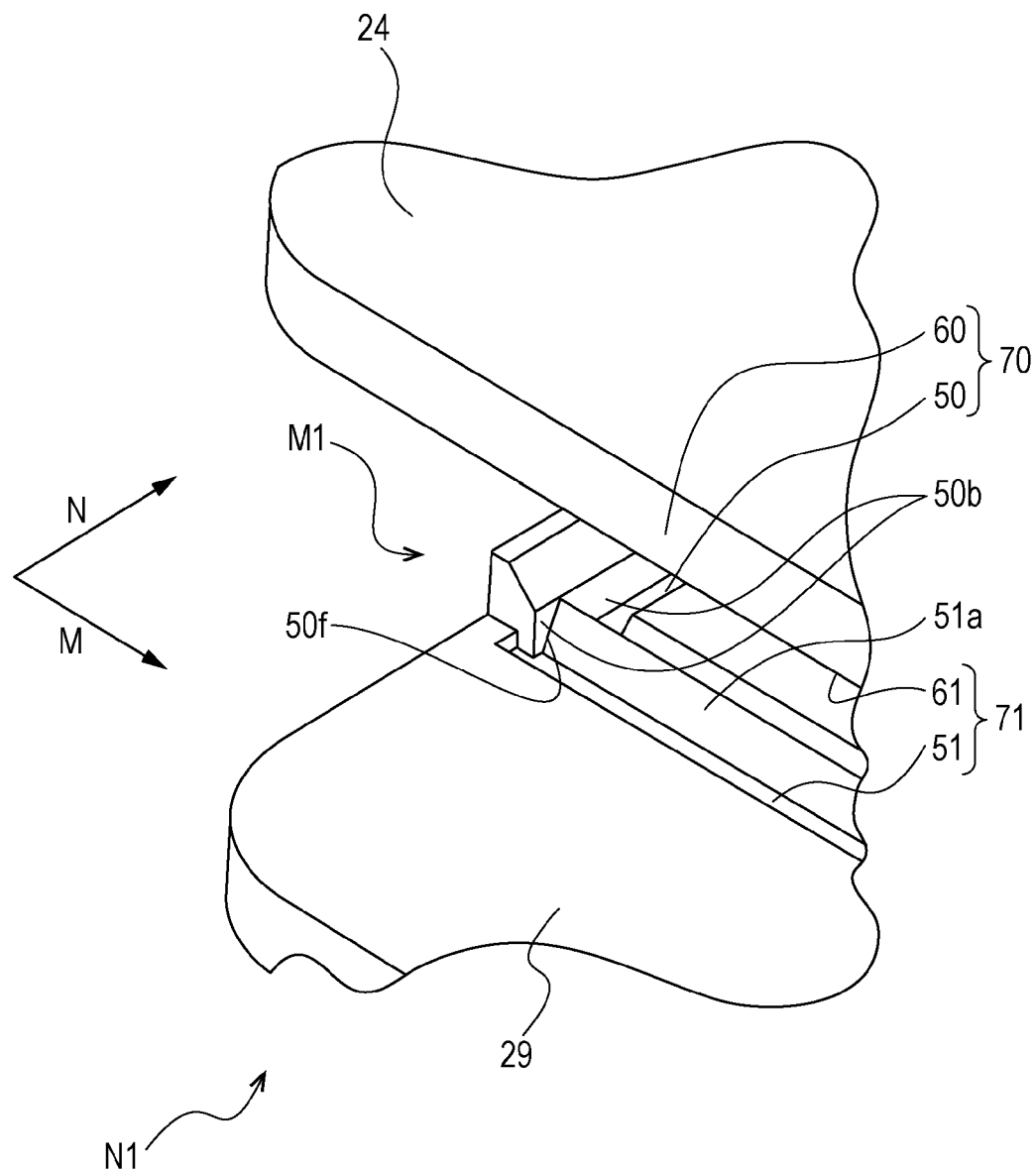
FIG. 29 is a perspective view to illustrate a connecting portion between the first adhering portion and second adhering portion.

FIG. 29 is a perspective view to describe the connecting portion between the first adhering portion 70 and second adhering portion 71.

Figure 30:
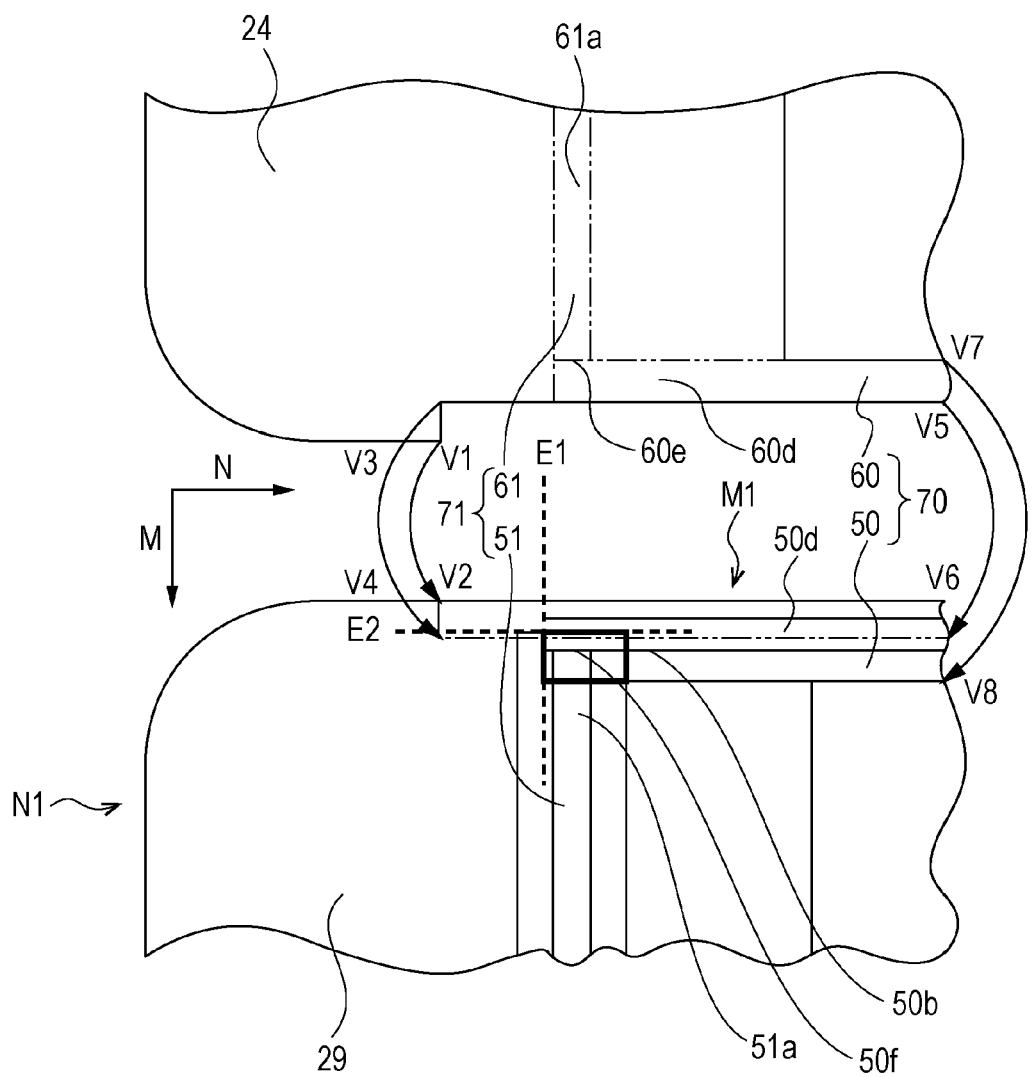
FIG. 30 is an expanded view to illustrate a connecting portion between the first adhering portion and second adhering portion.

FIG. 30 is a development diagram of the developer frame 24 and toner container lid 29. Positions V1, V3, V5, and V7 of the developer frame 24 are matched to the positions V2, V4, V6, and V8 of the toner container lid 29, whereby the developer container 21 is configured.

As illustrated in FIG. 29, the toner container lid 29 has a inner-side face 50b on the recessed adhering portion 50 of the first adhering portion 70 and a protrusion 51a on the protruding adhering portion 50 of the second adhering portion 71, and is made up of the protruding adhering portion 60 and flat adhering portion 61 of the developer frame 24 that faces the inner side face 50b and protrusion 51a. In the lengthwise direction N of the toner container lid 29, the inner side face 50b of the first adhering portion 70 is disposed farther on the outer side than the protrusion 51a of the second adhering portion 71. Also, the protrusion 51a of the second adhering portion 71 is formed as to the inner side face 50b of the first adhering portion 70, without discontinuation at the connecting portion 50f to the inner side face 50b near the end portion of the recessed adhering portion 50 of the first adhering portion 70. Accordingly, the inner side face 50b on the melting portion of the first adhering portion 70 and the protrusion 51a on the melting portion of the second adhering portion 71 are formed continuously in a T-shape.

Also, the protruding adhering portion 60 that faces the recessed adhering portion 50 of the first adhering portion 70, and the flat adhering portion 61 that faces the protruding adhering portion 51 of the second adhering portion 71, are formed continuously with a continuous portion 60e.

Further, the protrusion 51a may be formed continuously with the sloped face 50d.

A region where the first and second adhering portions overlap will be described with reference to FIG. 30. According to the present embodiment, the first adhering portion is configured in a region from the end portion (E1) of the recessed adhering portion 50 to the other end portion of the recessed adhering portion 50. On the other hand, a second adhering portion is configured in a region from the end portion (E2) of the protruding adhering portion 51 to the other end portion. That is to say, the region illustrated in FIG. 30 is a region wherein the first adhering portion and second adhering portion overlap each other. The first adhering portion to the second adhering portion are connected continuously by this region, which can provide a developer container that decreases leaking of developer after joining by adhering.

Modification of Connecting Portion of First and Second Adhering Portions

A configuration may be made as a modification of the joining portions described above, wherein the protrusion 51a of the protruding adhering portion 51 is provided to the developer frame 24. This configuration will be described with reference to FIG. 31.

Figure 31:
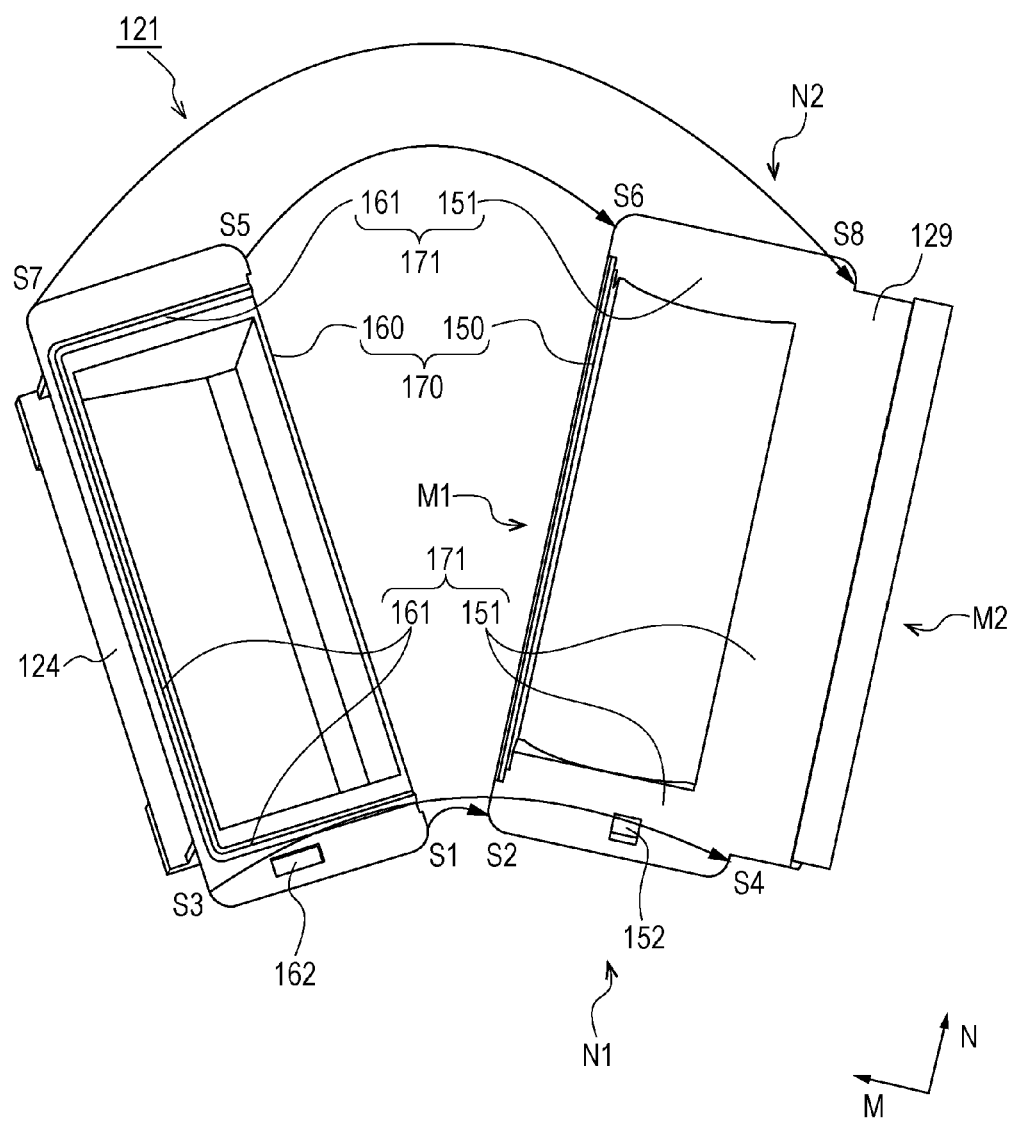
FIG. 31 is a perspective view to illustrate a joining configuration of the toner container lid and developer frame.

FIG. 31 is a perspective view of the developer frame 124 and toner container lid 129, illustrating a modification of a joining portion. The angles S1, S3, S5, and S7 of the developer frame 124 are matched to the angles S2, S4, S6, and S8 of the toner container lid 129, whereby the developer container 121 is configured.

As illustrated in FIG. 31, the toner container lid 29 is made up of a recessed adhering portion 150 of a first adhering portion 170 and a flat adhering portion 161 of a second adhering portion 171. Also, the developer frame 124 is made up of an adhesion-receiving protruding portion 160 of a first adhering portion 170 and a protruding adhering portion 151 of a second adhering portion 171.

FIG. 31 illustrates performing positioning in the transverse direction M of the toner container lid 129 and developer frame 124 with the first adhering portion 170 which is provided to the one end side M1 in the transverse direction M. Positioning is not performed with the second adhering portion 171 that is formed on the other end side M2 in the transverse direction M of the toner container lid 129. The second adhering portion 171 can allow a minute amount of deviation within the range of the protrusion 51a not separating from the flat portion 61a at the time of adhering. Therefore, even in a case where there is a difference in the dimensions between the first adhering portion 170 of the toner container lid 129 and developer frame 124, the frames of the toner container lid 129 and developer 124 can be adhered without either being deformed.

The developer container 121 of the processing cartridge 5 has an attaching portion to attach parts such as the attaching portion of the developer blade 23, the attaching portion of the developer bearing 28 that supports the developing roller 22, and the attaching portion of a spill-inhibiting sheet 25. Also, a high degree of positioning accuracy is requested of parts such as the developer blade 23, developing roller 22, and spill-inhibiting sheet 25. Therefore, since the toner container lid 29 and developer frame 24 that make up the developer container 21 are adhered without deforming, the attaching portion of the developer blade 23 is not deformed. Also, the attaching portions that attach parts such as the attaching portion of the developer bearing 28 that supports the developing roller 22 and the attaching portion of the spill-inhibiting sheet 25 are not deformed. Therefore, the relative positional relation of the developer blade 23, developing roller 22, and spill-inhibiting sheet 25 are not changed by the adhesion, and image quality is improved.

Also, as illustrated in FIG. 28, positioning in the transverse direction M of the toner container lid 29 and developer frame 24 is performed with the first adhering portion 70, and the positioning in the lengthwise direction N is performed with the boss portion 52 and hole 62 that are provided to the one end side N1 end portion in the lengthwise direction N. Therefore, in a configuration according to the related art, in order to perform positioning in the transverse direction M and lengthwise direction N of the toner container lid 29 and developer frame 24, the boss portion and hole had to be provided at two locations. Conversely, not only does the boss portion and hole have to be provided at just one location, but the size of the developer container 21 can be reduced in the lengthwise direction N.

According to the present invention, the size of a developer container can be reduced by using a positioning adhering portion that is an integrated positioning portion and adhering portion. Also, in the case that the container is the same size, a developer container with an increased capacity for developer can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093096, filed Apr. 25, 2013, which is hereby incorporated by reference herein in its entirety.

What is claimed is:

1. A developer container that accommodates developer, comprising:
    a first frame that has a recessed portion which has a sloped face; and
    a second frame that has a first protruding portion;
    wherein the first frame and the second frame are joined by
        a first adhering portion in which the sloped face of the recessed portion and the first protruding portion are welded together, and
        a second adhering portion in which a second protruding portion on one of the first frame and the second frame and a flat portion on the other side of the first frame and the second frame are welded together,
    the recessed portion having a positioning inner side face that performs positioning of the first frame and the second frame.

2. A developer container according to claim 1, wherein the second adhering portion is provided in a direction intersecting the direction in which positioning is performed by the positioning inner side face.

3. The developer container according to claim 2, wherein the second adhering portion is provided in a direction that is orthogonal to the direction in which positioning is performed by the positioning inner side face.

4. The developer container according to claim 1, wherein at least one of the recessed portion and the first protruding portion has a sloped face.

5. The developer container according to claim 1, wherein the first frame comprises the second protruding portion, and the second frame comprises the flat portion.

6. The developer container according to claim 1, wherein the first frame comprises the flat portion, and the second frame comprises the second protruding portion.

7. The developer container according to claim 1, wherein the first adhering portion is configured such that the first protruding portion touches the inner side face for determination of the positional relation between the first frame and the second frame.

8. The developer container according to claim 1, wherein the first adhering portion is welded as a shared joint.

9. The developer container according to claim 1, wherein a plurality of first adhering portions are provided.

10. The developer container according to claim 9, wherein the plurality of first adhering portions are provided on a same line.

11. The developer container according to claim 1, wherein a region is provided in which a portion of the first adhering portion and a portion of the second adhering portion overlap.

12. The developer container according to claim 11, wherein the first frame and second frame are joined continuously from the first adhering portion to the second adhering portion.

13. A developing apparatus comprising:
    developer container according to claim 1; and
    a developer bearing member to bear the developer.

14. An image forming apparatus,
    wherein the developing apparatus according to claim 13 can be detachably mounted.

15. A cleaning apparatus comprising:
    a cleaning device configured to remove remaining developer; and
    the developer container according to claim 1, to contain the removed developer.

16. A process cartridge comprising:
    developer container according to claim 1; and
    an image-bearing member for forming a developed image using developer contained in the developer container.

17. A method to manufacture a developer container to contain developer, comprising:
    adhering together a first frame having a recessed portion which has a sloped face and a second frame having a first protruding portion;
    wherein the adhering process further includes
        a first process to adhere the sloped face of the recessed portion, which has a positioning inner side face to position the first frame and the second frame within the recessed portion, and the first protruding portion, and
        a second process to adhere a flat portion on one of the first frame and the second frame and a second protruding portion on the other of the first frame and the second frame.

18. A developer container for containing developer, comprising:
    a first frame that has a recessed portion; and
    a second frame that has a first protruding portion which has a sloped face;
    wherein the first frame and the second frame are joined together at:
    a first adhering portion in which the recessed portion and the sloped face of the first protruding portion are adhered together, and
    a second adhering portion in which a second protruding portion on one of the first frame and the second frame and a flat portion on the other of the first frame and the second frame are adhered together,
    the recessed portion having a positioning inner side face that performs positioning of the first frame with respect to the second frame.

* * * * *